United States Patent
Akiba et al.

(10) Patent No.: US 12,020,605 B2
(45) Date of Patent: Jun. 25, 2024

(54) CIRCUIT DEVICE, DISPLAY SYSTEM, AND ELECTRONIC APPARATUS

(71) Applicant: Seiko Epson Corporation, Tokyo (JP)

(72) Inventors: Yasutoshi Akiba, Chino (JP); Jeffrey Eric, Richmond (CA)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 17/829,438

(22) Filed: Jun. 1, 2022

(65) Prior Publication Data

US 2022/0392380 A1 Dec. 8, 2022

(30) Foreign Application Priority Data

Jun. 2, 2021 (JP) .................. 2021-092747

(51) Int. Cl.
*G09G 3/00* (2006.01)
*B60K 35/00* (2006.01)
(Continued)

(52) U.S. Cl.
CPC ............ *G09G 3/002* (2013.01); *B60K 35/00* (2013.01); *G02B 27/0101* (2013.01); *G02B 27/0179* (2013.01); *G06T 19/006* (2013.01); *G09G 3/001* (2013.01); *B60K 35/10* (2024.01); *B60K 35/23* (2024.01); *B60K 35/28* (2024.01); *B60K 35/81* (2024.01); *B60K 2360/149* (2024.01); *B60K 2360/177* (2024.01); *B60Y 2200/11* (2013.01); *G02B 2027/0138* (2013.01);
(Continued)

(58) Field of Classification Search
CPC ............ B60K 35/00; B60K 2370/149; B60K 2370/1529; B60K 2370/52; B60Y 2200/11; G02B 27/0101; G02B 27/0179; G02B 2027/0138; G02B 2027/014; G02B 2027/0183; G02B 2027/0187; G09G 3/002; G09G 2340/04; G09G 2380/10
See application file for complete search history.

(56) References Cited

U.S. PATENT DOCUMENTS

2019/0187790 A1* 6/2019 Woo .................. B60W 50/14
2019/0369396 A1* 12/2019 Smith ................. B60K 35/00

FOREIGN PATENT DOCUMENTS

| JP | 2019-098756 A | 6/2019 |
|---|---|---|
| JP | 2020-050328 A | 4/2020 |

* cited by examiner

*Primary Examiner* — Amy Onyekaba
*Assistant Examiner* — Cory A Almeida
(74) *Attorney, Agent, or Firm* — Harness, Dickey & Pierce, P.L.C.

(57) ABSTRACT

A circuit device includes a storing section configured to store a rendering image and a warp processing section. The warp processing section includes a coordinate converting section, a coordinate-address converting section, and an output section. The coordinate converting section converts, with coordinate conversion based on warp parameters and rotation correction parameters, an output coordinate, which is a coordinate on a display image, into an input coordinate, which is a coordinate on the rendering image. The coordinate-address converting section converts the input coordinate into a read address of the storing section. The output section reads out pixel data of the rendering image from the read address of the storing section and outputs, based on the read-out pixel data, pixel data in the output coordinate of the display image.

11 Claims, 14 Drawing Sheets

(51) Int. Cl.
  *B60K 35/10* (2024.01)
  *B60K 35/23* (2024.01)
  *B60K 35/28* (2024.01)
  *B60K 35/81* (2024.01)
  *G02B 27/01* (2006.01)
  *G06T 5/80* (2024.01)
  *G06T 19/00* (2011.01)
(52) U.S. Cl.
  CPC ............... *G02B 2027/014* (2013.01); *G02B 2027/0183* (2013.01); *G02B 2027/0187* (2013.01); *G02B 2027/0196* (2013.01); *G06T 5/80* (2024.01); *G09G 2340/04* (2013.01); *G09G 2380/10* (2013.01)

FIG. 2
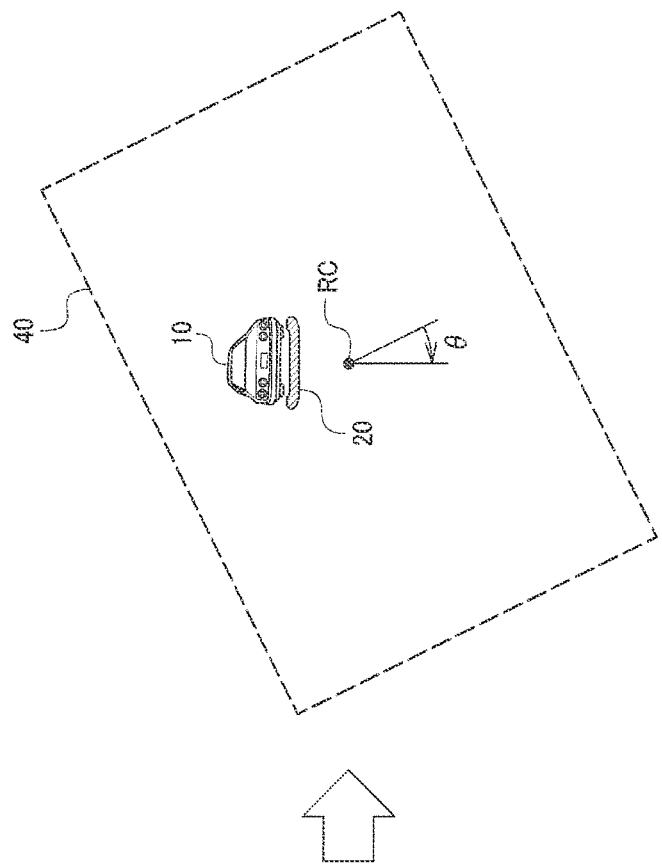
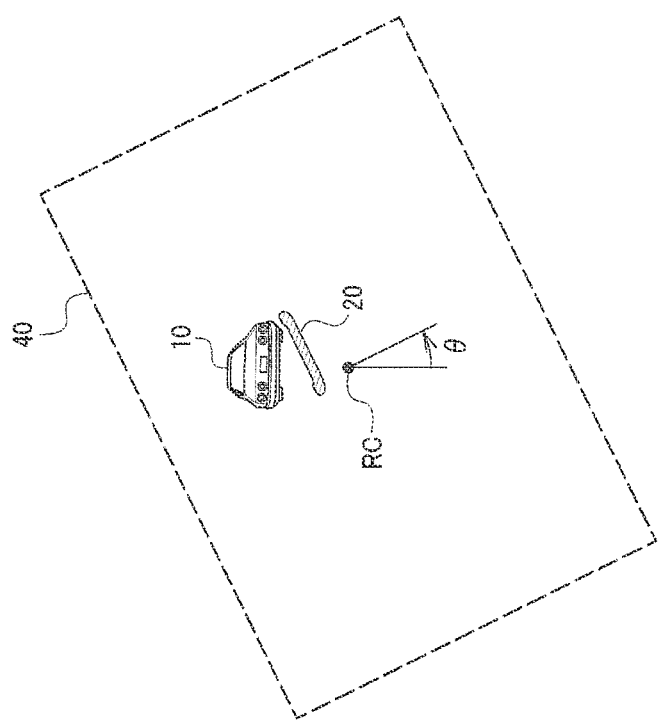

CIRCUIT DEVICE, DISPLAY SYSTEM, AND ELECTRONIC APPARATUS

The present application is based on, and claims priority from JP Application Serial Number 2021-092747, filed Jun. 2, 2021, the disclosure of which is hereby incorporated by reference herein in its entirety.

BACKGROUND

1. Technical Field

The present disclosure relates to a circuit device, a display system, an electronic apparatus, and the like.

2. Related Art

There has been known a head-up display that displays an image on a transparent screen or the like to display information over a visual field of a user. By combining such a head-up display and the AR technology, it is possible to cause the head-up display to display a virtual object such that the virtual object follows a real object such as a preceding vehicle or a road. AR is an abbreviation of Augmented Reality.

JP-A-2019-98756 (Patent Literature 1) and JP-A-2020-050328 (Patent Literature 2) disclose a technique for performing vibration correction for causing a virtual object of the AR to follow a real object. In Patent Literature 1, a posture change in a low frequency band is corrected by image processing and a posture change in a high frequency band is corrected by a projection optical unit. Since the posture change in the high frequency band is corrected by the projection optical unit, when a posture change of a vehicle occurs, the position of a projected image is corrected such that a virtual image is superimposed on a real image in a correct position. In Patent Literature 2, an image for which the vibration correction is necessary and an image for which the vibration correction is unnecessary are combined on a frame memory and a combined image is subjected to distortion correction.

Patent Literature 1 and Patent Literature 2 do not disclose a specific configuration of warp processing in which correction such as the vibration correction is performed. In Patent Literature 1, the posture change in the high frequency band is corrected by the projection optical unit and is not corrected in the warp processing. In Patent Literature 2, a correction circuit shown in FIG. 6 and the like perform the distortion correction but a specific configuration of the correction circuit is not described.

SUMMARY

An aspect of the present disclosure relates to a circuit device that performs display control for a head-up display that displays, in a display region, a virtual object corresponding to a real object in a real space, the circuit device including: a storing section configured to store a rendering image including the virtual object; and a warp processing section configured to perform warp processing for the rendering image and generate a display image to be displayed in the display region. The warp processing section includes: a coordinate converting section configured to convert, with coordinate conversion based on warp parameters corresponding to a distortion of a video due to an optical system and rotation correction parameters, an output coordinate, which is a coordinate on the display image, into an input coordinate, which is a coordinate on the rendering image, to calculate the input coordinate to which rotation processing for correcting rotation indicated by the rotation correction parameters is applied; a coordinate-address converting section configured to convert the input coordinate into a read address of the storing section; and an output section configured to read out pixel data of the rendering image from the read address of the storing section and output, based on the read-out pixel data, pixel data in the output coordinate of the display image.

Another aspect of the present disclosure relates to a display system of a head-up display that displays, in a display region, a virtual object corresponding to a real object in a real space, the display system including: a rendering-image generating section configured to generate a rendering image including the virtual object; a storing section configured to store the rendering image; and a warp processing section configured to perform warp processing for the rendering image and generate a display image to be displayed in the display region. The warp processing section includes: a coordinate converting section configured to convert, with coordinate conversion based on warp parameters corresponding to a distortion of a video due to an optical system and rotation correction parameters, an output coordinate, which is a coordinate on the display image, into an input coordinate, which is a coordinate on the rendering image, to calculate the input coordinate to which rotation processing for correcting rotation indicated by the rotation correction parameters is applied; a coordinate-address converting section configured to convert the input coordinate into a read address of the storing section; and an output section configured to read out pixel data of the rendering image from the read address of the storing section and output, based on the read-out pixel data, pixel data in the output coordinate of the display image.

Still another aspect of the present disclosure relates to an electronic apparatus including the circuit device described above.

BRIEF DESCRIPTION OF THE DRAWINGS

FIG. 2 is a diagram for explaining latency compensation in an embodiment.

DESCRIPTION OF EXEMPLARY EMBODIMENTS

A preferred embodiment of the present disclosure is explained in detail below. The embodiment explained below does not unduly limit the content described in claims. Not all of components explained in this embodiment are always essential constituent elements.

1. Configuration Example of a Circuit Device

Figure 1:
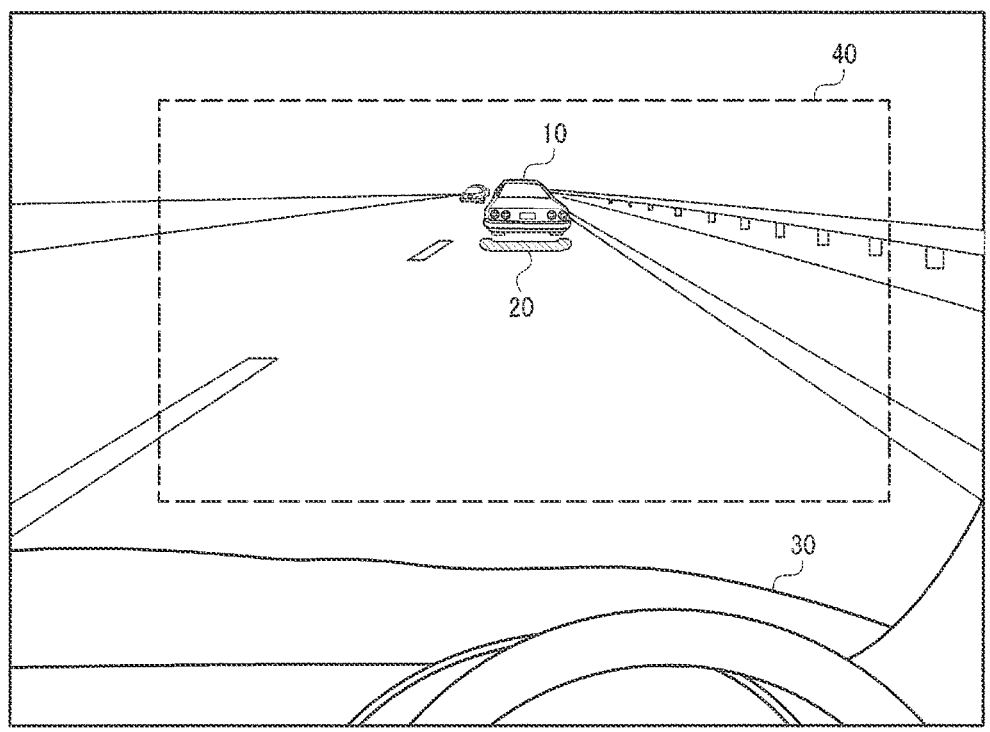
FIG. 1 is an example of AR display by a HUD.

First, AR display by a HUD is explained. FIG. 1 is an example of the AR display by the HUD. HUD is an abbreviation of a head-up display. AR is an abbreviation of augmented reality. In the following explanation, an example in which the HUD is mounted on an automobile 30 is mainly explained. However, the HUD in this embodiment may be mounted on various moving bodies such as a plane, a ship, and a motorcycle.

In FIG. 1, AR display viewed by a driver via the HUD is shown. The driver is viewing, through a windshield, a preceding vehicle 10, a road on which the preceding vehicle 10 travels, and a scene around the preceding vehicle 10 and the road. The driver is viewing a virtual image projected in a display region 40 of the windshield by the HUD. The virtual image is seen from the driver as a virtual object 20 overlapping a real space. The display region 40 indicates a range in which the HUD is capable of projecting the virtual image. The virtual object 20 is displayed in the display region 40. The virtual object 20 in FIG. 1 is a display object of the AR and is displayed such that a display position follows the preceding vehicle 10 or the road. That is, the HUD attempts to display the virtual object 20 such that a relative positional relation between the preceding vehicle 10 or the road and the virtual object 20 viewed from the driver does not change.

A display system of the HUD tracks the preceding vehicle 10 or the like using a sensor such as a Lidar, renders the virtual object 20 based on a result of the tracking, subjects a rendering image of the virtual object 20 to warp processing, and causes the HUD to display the rendering image. At this time, a delay due to tracking processing, rendering processing, warp processing, data communication, or the like is present from timing when the sensor performs sampling until timing when the virtual object 20 is displayed on the HUD. Such a delay caused by the processing, the communication, or the like is called latency.

The latency is a cause of positional deviation and rotational deviation between the virtual object 20 and the preceding vehicle 10 or the like. That is, the position and the angle of the preceding vehicle 10 or the like at the time when the display system renders the virtual object 20 and the position and the angle of the preceding vehicle 10 or the like at the time when the virtual object 20 is actually displayed on the HUD deviate, whereby the virtual object 20 and the preceding vehicle 10 or the like are displayed to deviate. For example, in the rendering processing, even if a position and an angle of the preceding vehicle 10 or the like at future display timing is predicted, since there is a time period from a point in time of the prediction to display, the predicted position and the predicted angle of the preceding vehicle 10 or the like and the position and the angle of the preceding vehicle 10 or the like at the time when the virtual object 20 is actually displayed on the HUD are likely to deviate. In the embodiment explained below, correction of rotational deviation is mainly explained. However, a circuit device or a display system according to the present disclosure may further perform correction of positional deviation.

FIG. 2 is a diagram for explaining latency compensation in this embodiment. In a left figure of FIG. 2, an example of HUD display in the case in which the latency compensation is not performed is shown. As shown in the left figure of FIG. 2, when an automobile mounted with the HUD rotates by $\theta$ counterclockwise, the display region 40 of the HUD rotates by $\theta$ counterclockwise. RC indicates a rotation center. Consequently, the virtual object 20 is displayed to rotate by $\theta$ with respect to the preceding vehicle 10, which is a real object. It is assumed that the virtual object 20 rotates at speed that rendering cannot follow, that is, rotates at speed that causes a problem of latency from the rendering to the HUD display.

A right figure of FIG. 2 shows an example of HUD display in the case in which the latency compensation is performed. As shown in the right figure of FIG. 2, in this embodiment, the virtual object 20 is displayed to rotate by $\theta$ clockwise around the RC to compensate for the rotational deviation due to the latency and match the preceding vehicle 10, which is the real object, and the display of the virtual object 20. By performing such latency compensation, even if the automobile mounted with the HUD rotates, the rotational deviation of the display can be avoided. As explained in detail below, in this embodiment, positional deviation due to the latency can be reduced as much as possible by performing the latency compensation in warp processing as close as possible to display timing.

The circuit device and the display system according to the present disclosure may perform rotational deviation correction for correcting a HUD attachment error in addition to the rotational deviation correction of the latency compensation. When a former correction angle is represented as $\theta$ lat and a latter correction angle is represented as $\theta$ err, a total correction angle is $\theta = \theta$ lat$+\theta$ err. $\theta$ lat is a parameter that fluctuates according to rotation of the HUD. $\theta$ err is a fixed parameter corresponding to an attachment error. In the embodiment explained below, a case in which a correction angle is $\theta = \theta$ lat is mainly explained. By adding $\theta$ err to the correction angle $\theta$, it is possible to add the correction of the attachment error as explained above.

Figure 3:
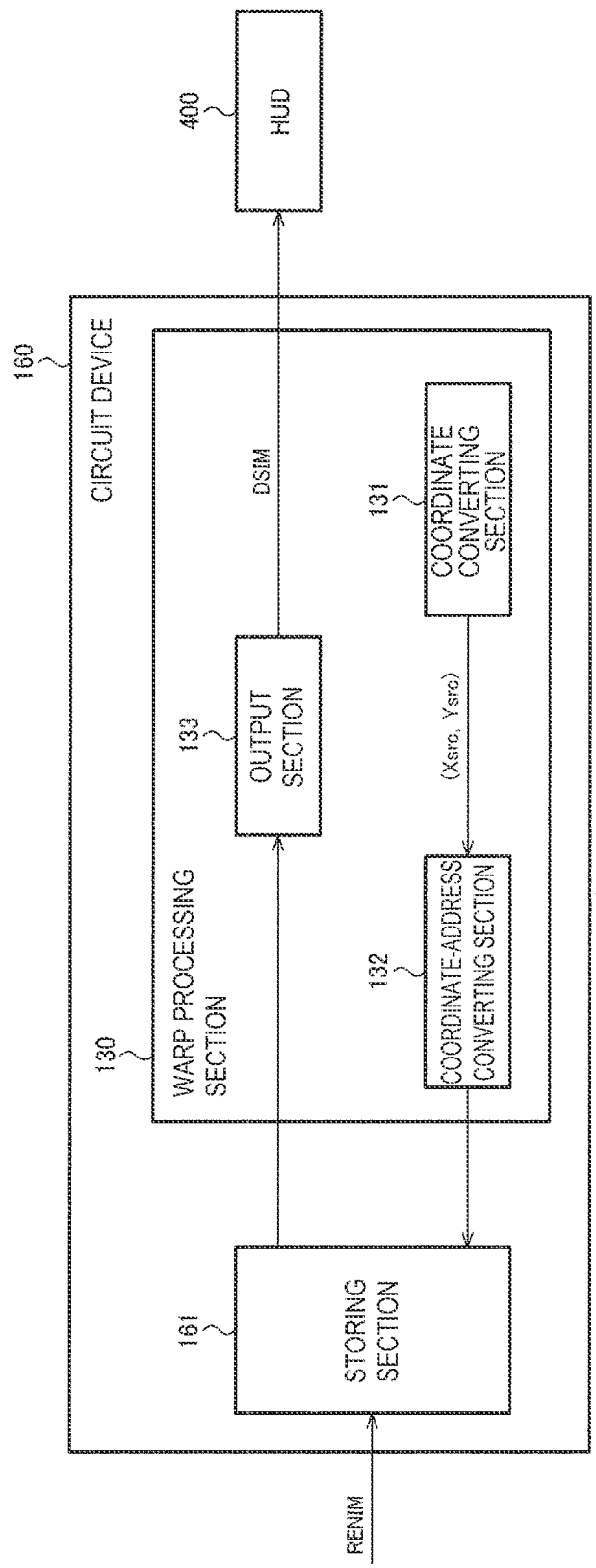
FIG. 3 is a configuration example of a circuit device.

FIG. 3 is a configuration example of a circuit device 160 in this embodiment. The circuit device 160 performs display control for a HUD 400 that displays, in the display region 40, the virtual object 20 corresponding to a real object in a real space. The circuit device 160 includes a storing section 161 and a warp processing section 130. The circuit device 160 is called a HUD controller as well and is configured by, for example, an integrated circuit device in which a circuit is integrated on a semiconductor substrate.

The storing section 161 temporarily stores a rendering image RENIM including the virtual object 20. The rendering image RENIM is input to the circuit device 160 from, for example, an external MPU. However, rendering may be performed in the circuit device 160. The storing section 161 is a line buffer that stores image data of the number of lines necessary for warp processing. The number of lines only has to be a degree obtained by adding a margin to a maximum number of moving lines in the vertical direction in the warp processing. The storing section 161 is a semiconductor memory such as a RAM. RAM is an abbreviation of Random Access Memory.

The warp processing section 130 performs the warp processing for the rendering image RENIM to generate a display image DSIM to be displayed in the display region 40 and outputs the display image DSIM to the HUD 400. The warp processing is coordinate conversion between the rendering image RENIM and the display image DSIM. In this embodiment, the warp processing includes distortion correction and rotational deviation correction. In this embodiment, the warp processing section 130 is an inverse warp engine. Inverse warp is conversion for calculating pixels of an output image of a warp engine from a pixel in any position in an input image. The inverse warp engine is a warp engine having the function of the inverse warp.

The warp processing section 130 includes a coordinate converting section 131, a coordinate-address converting section 132, and an output section 133. The warp processing section 130 is configured by a logic circuit and is configured by, for example, a gate array automatically disposed and wired or a standard cell array automatically wired.

The coordinate converting section 131 converts, with coordinate conversion based on warp parameters and rotation correction parameters, an output coordinate (Xtrg, Ytrg), which is a coordinate on the display image DSIM, into an input coordinate (Xsrc, Ysrc), which is a coordinate on the rendering image RENIM. Consequently, the coordinate converting section 131 calculates the input coordinate (Xsrc, Ysrc) to which rotation processing for correcting a rotation indicated by the rotation correction parameters is applied.

The warp parameters are parameters corresponding to a distortion of a video due to an optical system of the HUD 400. The optical system is, for example, a lens for projecting a video onto a screen, the screen onto which the video is projected, or both of the lens and the screen. The distortion of the video is, for example, a distortion due to a distortion aberration of the lens, a distortion due to bending of the screen, or both of the distortions. The distortion correction is correction for canceling the distortion of the video. An image subjected to the distortion correction is projected onto the screen, whereby the image is displayed in a visual field of an observer as a virtual image without a distortion.

The rotation correction parameters are parameters corresponding to rotational deviation between a real object and a virtual object displayed following the real object. The rotational deviation correction is processing for correcting the rotational deviation. The rotational deviation is caused by a posture change of a moving body on which the HUD is mounted. The rotational deviation correction is performed according to the posture change of the moving body.

Figure 4:
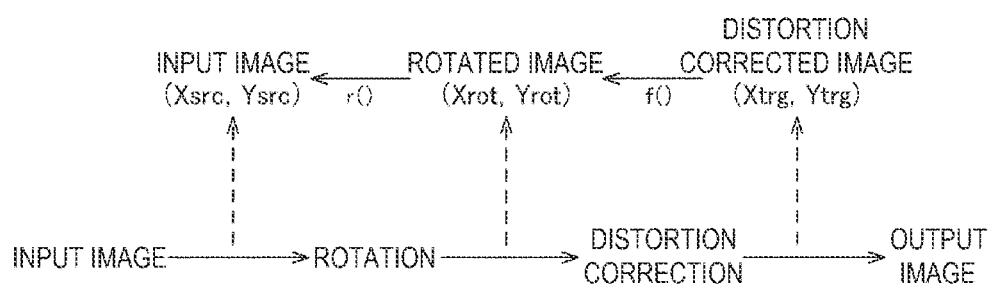
FIG. 4 is a schematic diagram of coordinate conversion.

In FIG. 4, a schematic diagram of coordinate conversion is shown. In FIG. 4, f( ) indicates distortion correction and r( ) indicates rotational deviation correction. Coordinate conversion of the distortion correction is represented by the following Expression (1). In the following Expression (1), when a conversion matrix is represented as Adis, elements in the Adis correspond to the warp parameters. Coordinate conversion of the rotational deviation correction is represented by the following Expression (2). In the following Expression (2), when a conversion matrix is represented as Arot, cos θ and sin θ in the Arot are equivalent to the rotation correction parameters. (cx, cy) is a coordinate of the rotation center RC. θ may be set as the rotation correction parameter.

$$\begin{bmatrix} Xrot \\ Yrot \\ 1 \end{bmatrix} = \begin{bmatrix} a_{14} & a_{13} & a_{12} & \ldots & a_0 \\ b_{14} & b_{13} & b_{12} & \ldots & b_0 \\ 0 & 0 & 0 & \ldots & 1 \end{bmatrix} \begin{bmatrix} Xtrg^4 \\ Ytrg^4 \\ \vdots \\ 1 \end{bmatrix} \equiv Adis \cdot \begin{bmatrix} Xtrg^4 \\ Ytrg^4 \\ \vdots \\ 1 \end{bmatrix} \quad (1)$$

$$\begin{bmatrix} Xsrc \\ Ysrc \\ 1 \end{bmatrix} = \begin{bmatrix} \cos\theta & -\sin\theta & 0 \\ \sin\theta & \cos\theta & 0 \\ 0 & 0 & 1 \end{bmatrix} \left( \begin{bmatrix} Xrot \\ Yrot \\ 1 \end{bmatrix} - \begin{bmatrix} cx \\ cy \\ 1 \end{bmatrix} \right) + \begin{bmatrix} cx \\ cy \\ 1 \end{bmatrix} \quad (2)$$

$$= \begin{bmatrix} \cos\theta & -\sin\theta & cx(1-\cos\theta) + cy\sin\theta \\ \sin\theta & \cos\theta & cy(1-\cos\theta) - cx\sin\theta \\ 0 & 0 & 1 \end{bmatrix} \begin{bmatrix} Xrot \\ Yrot \\ 1 \end{bmatrix} \equiv Arot \cdot \begin{bmatrix} Xrot \\ Yrot \\ 1 \end{bmatrix}$$

The above Expression (1) indicates, in a matrix format, polynomials of the following Expressions (3) and (4). That is, the warp parameters are equivalent to coefficients of terms of the polynomials. The above Expression (1) and the following Expressions (3) and (4) indicate examples of quadric polynomials. However, a degree of a polynomial is not limited to quadric.

$$\begin{aligned} Xrot = & a_{14}Xtrg^4 + a_{13}Ytrg^4 + a_{12}Xtrg^3Ytrg + \\ & a_{11}Xtrg^2Ytrg^2 + a_{10}XtrgYtrg^3 + a_9Xtrg^3 + a_8Ytrg^3 + \\ & a_7Xtrg^2Ytrg + a_6XtrgYtrg^2 + a_5Xtrg^2 + a_4Ytrg^2 + \\ & a_3XtrgYtrg + a_2Xtrg + a_1Ytrg + a_0 \end{aligned} \quad (3)$$

$$\begin{aligned} Yrot = & b_{14}Xtrg^4 + b_{13}Ytrg^4 + b_{12}Xtrg^3Ytrg + \\ & b_{11}Xtrg^2Ytrg^2 + b_{10}XtrgYtrg^3 + b_9Xtrg^3 + b_8Ytrg^3 + \\ & b_7Xtrg^2Ytrg + b_6XtrgYtrg^2 + b_5Xtrg^2 + b_4Ytrg^2 + \\ & b_3XtrgYtrg + b_2Xtrg + b_1Ytrg + b_0 \end{aligned} \quad (4)$$

The coordinate converting section 131 executes the distortion correction and the rotational deviation correction collectively or in two stages. The collective execution is explained below in a first detailed configuration example. The execution in the two stages is explained below in a second detailed configuration example. An overview of the distortion correction and the rotational deviation correction is explained using numerical formulas.

When the distortion correction and the rotational deviation correction are collectively executed, as indicated by the following Expressions (5) to (7), the warp parameters are corrected by the rotation correction parameters. A post-correction warp parameters of the warp parameters are input to the coordinate converting section 131. In the following Expressions (5) to (7), elements of a conversion matrix Atot are equivalent to the post-correction warp parameters. As indicated by the following Expression (8), the coordinate converting section 131 performs coordinate conversion according to the conversion matrix Atot to simultaneously execute the distortion correction and the rotational deviation correction.

$$Atot = Arot \cdot Adis \quad (5)$$

$$= \begin{bmatrix} \cos\theta & -\sin\theta & cx(1-\cos\theta) + cy\sin\theta \\ \sin\theta & \cos\theta & cy(1-\cos\theta) - cx\sin\theta \\ 0 & 0 & 1 \end{bmatrix} \begin{bmatrix} a_{14} & a_{13} & a_{12} & \ldots & a_0 \\ b_{14} & b_{13} & b_{12} & \ldots & b_0 \\ 0 & 0 & 0 & \ldots & 1 \end{bmatrix}$$

$$= \begin{bmatrix} a'_{14} & a'_{13} & a'_{12} & \ldots & a'_0 \\ b'_{14} & b'_{13} & b'_{12} & \ldots & b'_0 \\ 0 & 0 & 0 & \ldots & 1 \end{bmatrix}$$

$$a'_{14} = a_{14}\cos\theta - b_{14}\sin\theta \quad (6)$$

$$a'_{13} = a_{13}\cos\theta - b_{13}\sin\theta$$

$$a'_{12} = a_{12}\cos\theta - b_{12}\sin\theta$$

$$\vdots$$

$$a'_0 = a_0\cos\theta - b_0\sin\theta + cx(1-\cos\theta) + cy\sin\theta$$

$$b'_{14} = a_{14}\sin\theta - b_{14}\cos\theta \quad (7)$$

$$b'_{13} = a_{13}\sin\theta - b_{13}\cos\theta$$

-continued $$b'_{12} = a_{12}\sin\theta - b_{12}\cos\theta$$

$$\vdots$$

$$b'_0 = a_0\sin\theta - b_0\cos\theta + cy(1 - \cos\theta) + cx\sin\theta$$

$$\begin{bmatrix} Xsrc \\ Ysrc \\ 1 \end{bmatrix} = Atot \cdot \begin{bmatrix} Xtrg^4 \\ Ytrg^4 \\ \vdots \\ 1 \end{bmatrix} \quad (8)$$

When the distortion correction and the rotational deviation correction are executed in the two stages, the coordinate converting section 131 performs the coordinate conversion of the distortion correction indicated by the above Expression (1) and thereafter performs, for a coordinate (xrot, yrot) after the conversion, the coordinate conversion of the rotation correction indicated by the above Expression (2) to execute the distortion correction and the rotational deviation correction in two stages.

The coordinate-address converting section 132 shown in FIG. 3 converts the input coordinate (Xsrc, Ysrc) calculated by the coordinate converting section 131 into a read address of the storing section 161. That is, when an address in which pixel data of the input coordinate (Xsrc, Ysrc) is stored is represented as ADDRxy, the coordinate-address converting section 132 converts the input coordinate (Xsrc, Ysrc) into a read address ADDRxy.

The output section 133 reads out pixel data of the rendering image RENIM from the read address ADDRxy of the storing section 161 and outputs pixel data in the output coordinate (Xtrg, Ytrg) based on the read-out pixel data. As explained below, the output section 133 may output the pixel data in the output coordinate (Xtrg, Ytrg) by reading out a plurality of pixel data around the input coordinate (Xsrc, Ysrc) and subjecting the plurality of pixel data to interpolation processing.

According to the embodiment explained above, immediately before the pixel data is read out from the storing section 161, the coordinate conversion based on the warp parameters and the rotation correction parameters is executed. The display image DSIM is output based on the read-out pixel data. Consequently, it is possible to minimize latency from the rotational deviation correction to the output of the display image DSIM. When this embodiment is applied to the AR display explained above, it is possible to cause the virtual object 20 to highly accurately follow the preceding vehicle 10, which is the real object.

In Patent Literature 1 described above, a measuring time of posture data is set shorter than a communication time of image data and the like and the projection optical unit performs correction in a high frequency domain using the posture data to suppress positional deviation between a real image and a projected image due to the communication time. However, since a data processing time for controlling the projection optical unit and an actuation time of constituent members are necessary, positional deviation caused by the times still remains. In Patent Literature 2 described above, a warp parameter table for one screen applied with vibration correction is prepared on a memory and warp processing is performed using the warp parameter table for one screen to suppress positional deviation. However, since a time for preparing the warp parameter table for one screen on the memory is necessary, positional deviation caused by the time still remains. Since a specific configuration of the warp processing is not described, content concerning latency in the warp processing is unknown.

In this embodiment, as indicated by the above Expressions (3) and (4), the warp parameters are the coefficients of the polynomial for correcting distortion of a video.

In distortion correction of a table scheme, a plurality of parameters corresponding to a plurality of coordinates are used. For example, in Patent Literature 2 described above, since vibration correction is applied to each parameter of the plurality of parameters, a calculation for the vibration correction takes time. In this regard, according to this embodiment, since the distortion correction is performed by the polynomial, the warp processing can be realized only by one set of warp parameters as indicated by the above Expressions (3) and (4). When the distortion correction and the rotational deviation correction are collectively executed, the warp parameters and the rotation matrix are multiplied. However, since the warp parameters are one set, a matrix operation only has to be performed once. A calculation time is reduced compared with the table scheme.

In this embodiment, the distortion correction of the table scheme may be adopted. For example, when the distortion correction and the rotational deviation correction are executed in two stages, since the distortion correction and the rotational deviation correction are separately calculated, a calculation time of the rotational deviation correction is considered to be the same irrespective of whether the distortion correction is the table scheme or the polynomial scheme.

2. First Detailed Configuration Example

Figure 5:
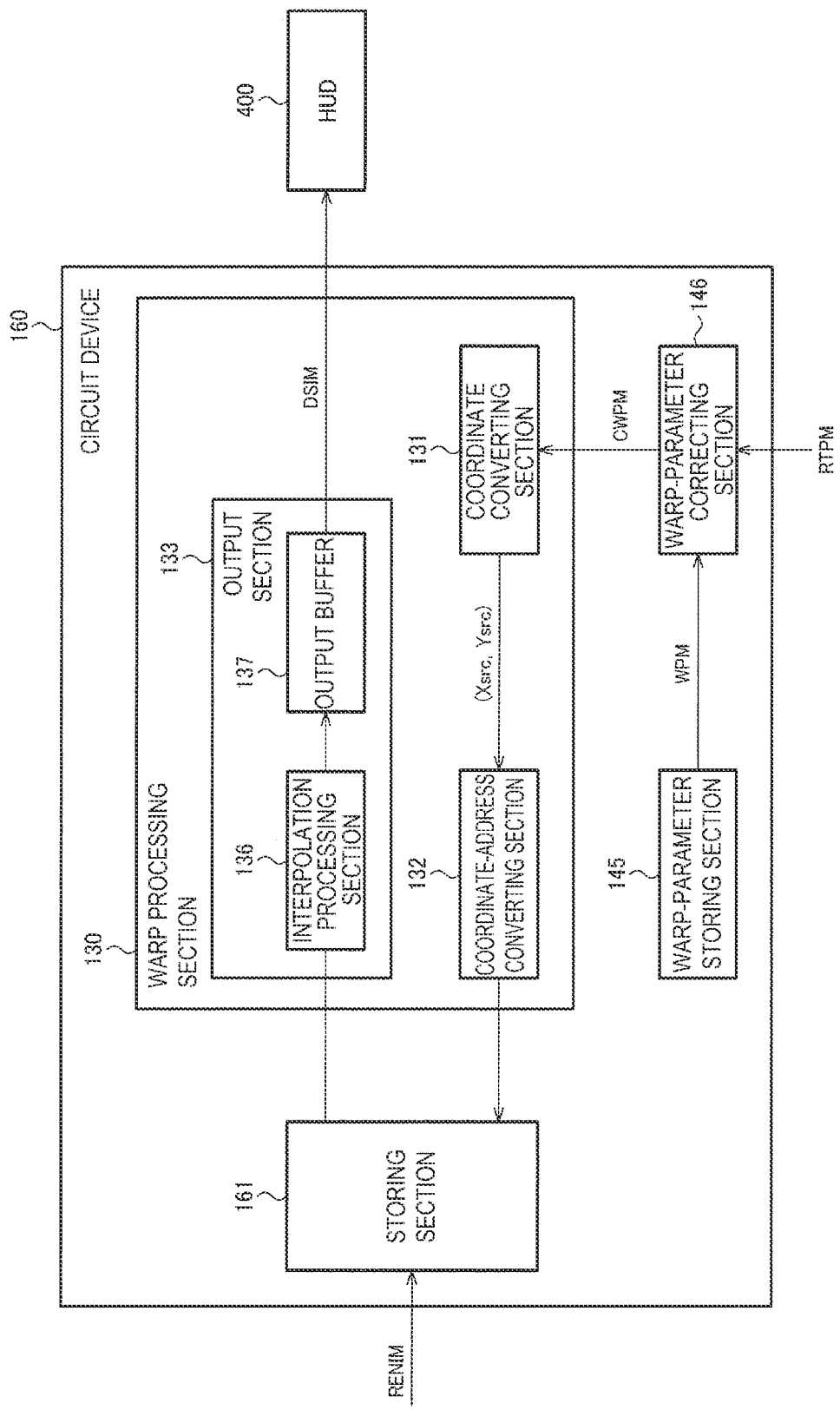
FIG. 5 is a first detailed configuration example of the circuit device.

FIG. 5 is a first detailed configuration example of the circuit device 160. In FIG. 5, the circuit device 160 includes a warp-parameter storing section 145 and a warp-parameter correcting section 146. The output section 133 includes an interpolation processing section 136 and an output buffer 137. The components explained above are denoted by the same reference numerals and signs and explanation about the components is omitted as appropriate.

The warp-parameter storing section 145 stores warp parameters WPM used in the distortion correction. The warp-parameter storing section 145 is a semiconductor memory such as a RAM or a nonvolatile memory. As explained above, the warp parameters WPM are the elements forming the conversion matrix Adis of the distortion correction and are specifically coefficients of a polynomial representing the distortion correction.

Rotation correction parameters RTPM are input to the warp-parameter correcting section 146. The rotation correction parameters RTPM are input to the circuit device 160 from an external MPU or the like. However, the rotation correction parameters RTPM may be calculated from tracking information in the circuit device 160. As explained above, the rotation correction parameters RTPM are cos θ and sin θ included in the conversion matrix Arot of the rotational deviation correction. θ is a parameter that fluctuates according to tracking information of a moving body or the like and is updated, for example, for each frame. However, an update interval of θ may be optional.

The warp-parameter correcting section 146 corrects the warp parameters WPM with the rotation correction parameters RTPM to calculate post-correction warp parameters CWPM. This calculation is the calculation indicated by the above Expression (5). The post-correction warp parameters CWPM are elements forming the conversion matrix Atot. The coordinate converting section 131 performs coordinate conversion using the post-correction warp parameters CWPM. The coordinate conversion is the calculation indicated by the above Expression (8).

According to the embodiment explained above, the warp-parameter correcting section 146 calculates the post-correction warp parameters CWPM immediately before the coordinate conversion by the coordinate converting section 131. The coordinate converting section 131 converts the output coordinate (Xtrg, Ytrg) into the input coordinate (Xsrc, Ysrc) using the post-correction warp parameters CWPM. Consequently, compared with a configuration in which the warp parameter table for one screen is prepared in the memory once as in Patent Literature 2 described above, it is possible to reduce latency from the acquisition of the rotation correction parameters RTPM to the output of the display image DSIM. More specifically, since the distortion correction is performed by the polynomial as explained above, the matrix operation only has to be performed once for the calculation of the post-correction warp parameters CWPM. Therefore, a calculation time is reduced compared with the table scheme.

The interpolation processing section 136 generates pixel data of the display image DSIM with interpolation processing. Specifically, the coordinate-address converting section 132 generates a read address group based on a reference read address, which is a read address. The read address group is a plurality of read addresses for reading out, from the storing section 161, a pixel data group around the input coordinate (Xsrc, Ysrc) output by the coordinate converting section 131. The reference read address is a read address corresponding to one pixel data in the pixel data group and is, for example, a read address of pixel data closest to the input coordinate (Xsrc, Ysrc). The interpolation processing section 136 reads out a pixel data group corresponding to the read address group and performs interpolation processing for the pixel data group to generate pixel data of the output coordinate (Xtrg, Ytrg).

The output buffer 137 buffers the pixel data output by the interpolation processing section 136 and outputs the pixel data to the HUD 400. The output buffer 137 is configured by an FIFO memory, a line buffer, or the like and only has to be able to temporarily store pixel data corresponding to a period shorter than one frame. For example, the output buffer 137 temporarily stores pixel data of approximately several pixels to tens of lines.

Figure 6:
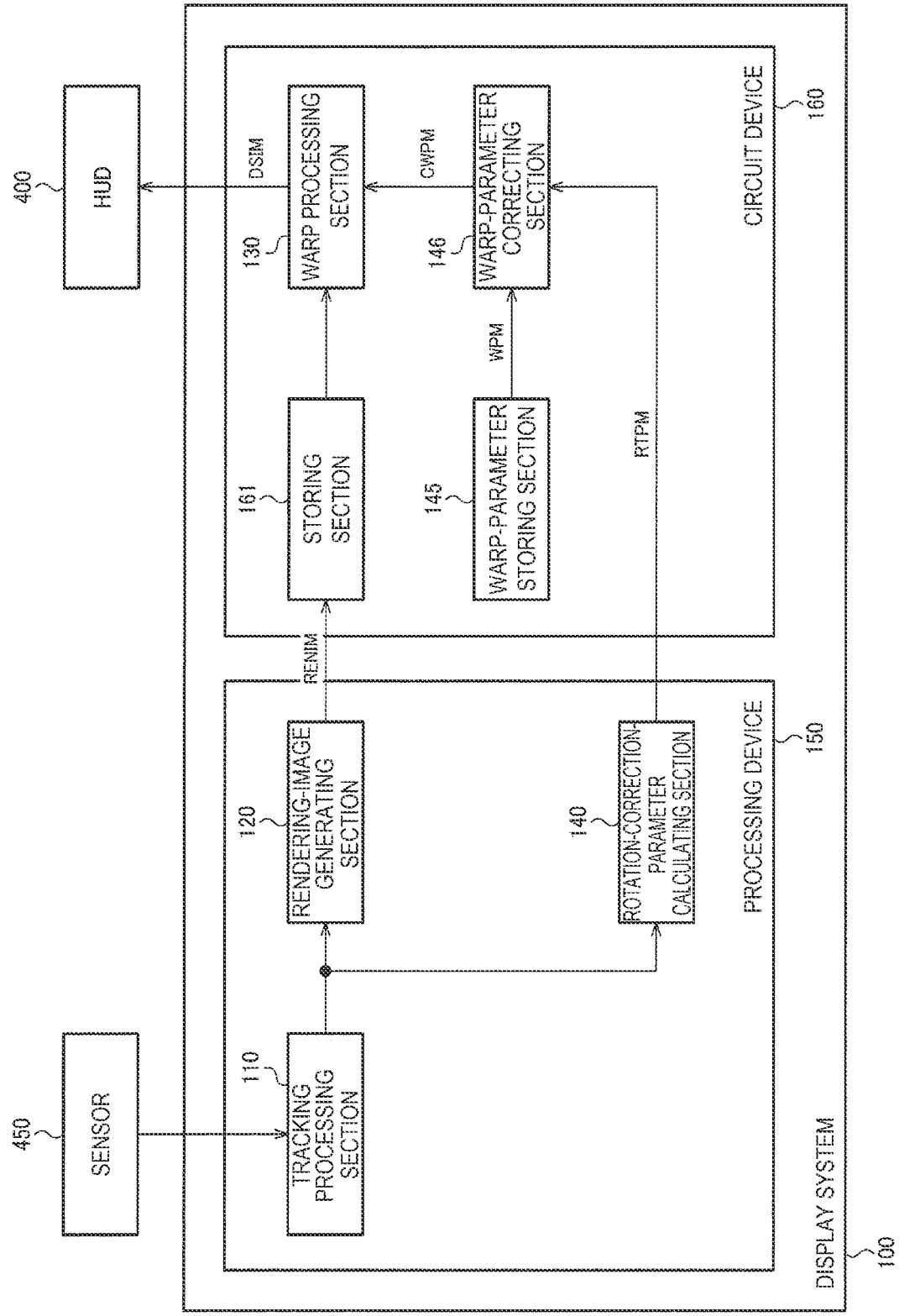
FIG. 6 is a first configuration example of a display system.

FIG. 6 is a first configuration example of a display system 100. The display system 100 includes the processing device 150 and the circuit device 160.

The processing device 150 includes a tracking processing section 110, a rendering-image generating section 120, and a rotation-correction-parameter calculating section 140. The processing device 150 is a processor such as a CPU, a GPU, or a microcomputer.

An output signal of a sensor 450 is input to the tracking processing section 110. The sensor 450 is a sensor that detects the position, the posture, or the motion of a moving body, an observer, or a real object. The sensor 450 is provided in the moving body and includes a Lidar, an IMU, a camera, an eye tracking sensor, or a head tracking sensor. Lidar is an abbreviation of Light Detection and Ranging. The Lidar is a sensor that acquires three-dimensional information such as a z map. IMU is an abbreviation of Inertial Measurement Unit. The IMU is a sensor that detects the motion of one axis or a plurality of axes. The IMU is configured by, for example, an acceleration sensor, a gyro sensor, or a combination of the acceleration sensor and the gyro sensor. The camera is a sensor that captures an image, which is two-dimensional information. The eye tracking sensor is a sensor that detects the position, the sight direction, or both of the position and the sight direction of the eyes of the observer. The head tracking sensor is a sensor that detects the position, the posture, or both of the position and the posture of the head of the observer.

The moving body is an object that carries the observer and the sensor 450 and moves in a real space and is, for example, an automobile, a motorcycle, an airplane, or a ship. The observer is a user who views a virtual image projected onto the HUD 400 and is an operator or an occupant of the moving body. The real object is an object present in the real space. The real object only has to be an object, the position or the posture of which in a HUD display region viewed from the observer fluctuates when the position or the posture of the observer or the object fluctuates.

The tracking processing section 110 tracks the position, the posture, or the motion of the moving body, the observer, or the real object based on an output signal of the sensor 450 and outputs a result of the tracking as tracking information. For example, the tracking processing section 110 tracks the real object based on two-dimensional ranging information received from the Lidar or a two-dimensional image received from the camera. The tracking processing section 110 tracks the automobile based on information concerning acceleration or angular velocity received from the IMU. The tracking processing section 110 tracks the eyes of the driver based on information concerning the position or the sight direction of the eyes received from the eye tracking sensor.

The tracking information may be information of any form if the tracking information is information indicating the position, the posture, or the motion of the moving body, the observer, or the real object. For example, the tracking information is a coordinate indicating a position, an angle indicating a posture, a vector indicating translation, or angular velocity indicating rotation in a real space. Alternatively, the tracking information may be information obtained by converting a coordinate or the like in the real space into a coordinate, an angle, a vector, angular velocity, or the like on an image. The tracking information includes first tracking information of the moving body, second tracking information of the observer, and third tracking information of the real object. However, the tracking information only has to include at least one of the first tracking information to the third tracking information. For example, the second tracking information of the observer may be omitted.

The tracking processing section 110 tracks the position, the posture, or the motion of the moving body, the observer, or the real object based on the output signal of the sensor 450 and outputs a result of the tracking as tracking information. For example, the tracking processing section 110 tracks the real object based on the two-dimensional ranging information received from the Lidar or the two-dimensional image received from the camera. The tracking processing section 110 tracks the automobile based on the information concerning the acceleration or the angular velocity received from the IMU. The tracking processing section 110 tracks the eyes of the driver based on the information concerning the position or the sight direction of the eyes received from the eye tracking sensor.

The tracking information may be information of any form if the tracking information is information indicating the position, the posture, or the motion of the moving body, the observer, or the real object. For example, the tracking information is a coordinate indicating a position, an angle indicating a posture, a vector indicating translation, or angular velocity indicating rotation in the real space. Alternatively, the tracking information may be information obtained by converting the coordinate or the like in the real space into a coordinate, an angle, a vector, angular velocity, or the like on an image. The tracking information includes first tracking information of the moving body, second tracking information of the observer, and third tracking information of the real object. However, the tracking information only has to include at least one of the first tracking information to the third tracking information. For example, the second tracking information of the observer may be omitted.

The rendering-image generating section 120 renders a virtual object based on the tracking information of the moving body, the observer, or the real object and outputs the rendering image RENIM including the virtual object. Specifically, the rendering-image generating section 120 calculates a position where the real object can be seen in a display region of the HUD 400 and renders the virtual object in a position corresponding to the position of the real object.

The rotation-correction-parameter calculating section 140 calculates the rotation correction parameters RTPM, which are latency compensation parameters, based on the tracking information. The tracking information used here is tracking information sampled later than the tracking information used for the rendering processing. From the viewpoint of minimizing latency, it is desirable to use tracking information acquired at timing immediately before or as close as possible to the parameter calculation. The latency compensation parameters are parameters for compensating for display deviation between a virtual object in a rendering image and a virtual object at display timing. In this embodiment, the latency compensation parameters are a rotation angle on image data or $\sin \theta$ and $\cos \theta$ at the time when the rotation angle is represented as $\theta$.

The circuit device 160 includes the storing section 161, the warp-parameter storing section 145, the warp-parameter correcting section 146, and the warp processing section 130. The operations of the sections are as explained with reference to FIG. 5.

The configurations of the processing device 150 and the circuit device 160 shown in FIG. 6 are examples. The display system 100 only has to include the tracking processing section 110, the rendering-image generating section 120, the rotation-correction-parameter calculating section 140, the storing section 161, the warp processing section 130, the warp-parameter storing section 145, and the warp-parameter correcting section 146. For example, the warp-parameter storing section 145 and the warp-parameter correcting section 146 included in the circuit device 160 in FIG. 6 may be included in the processing device 150.

Figure 7:
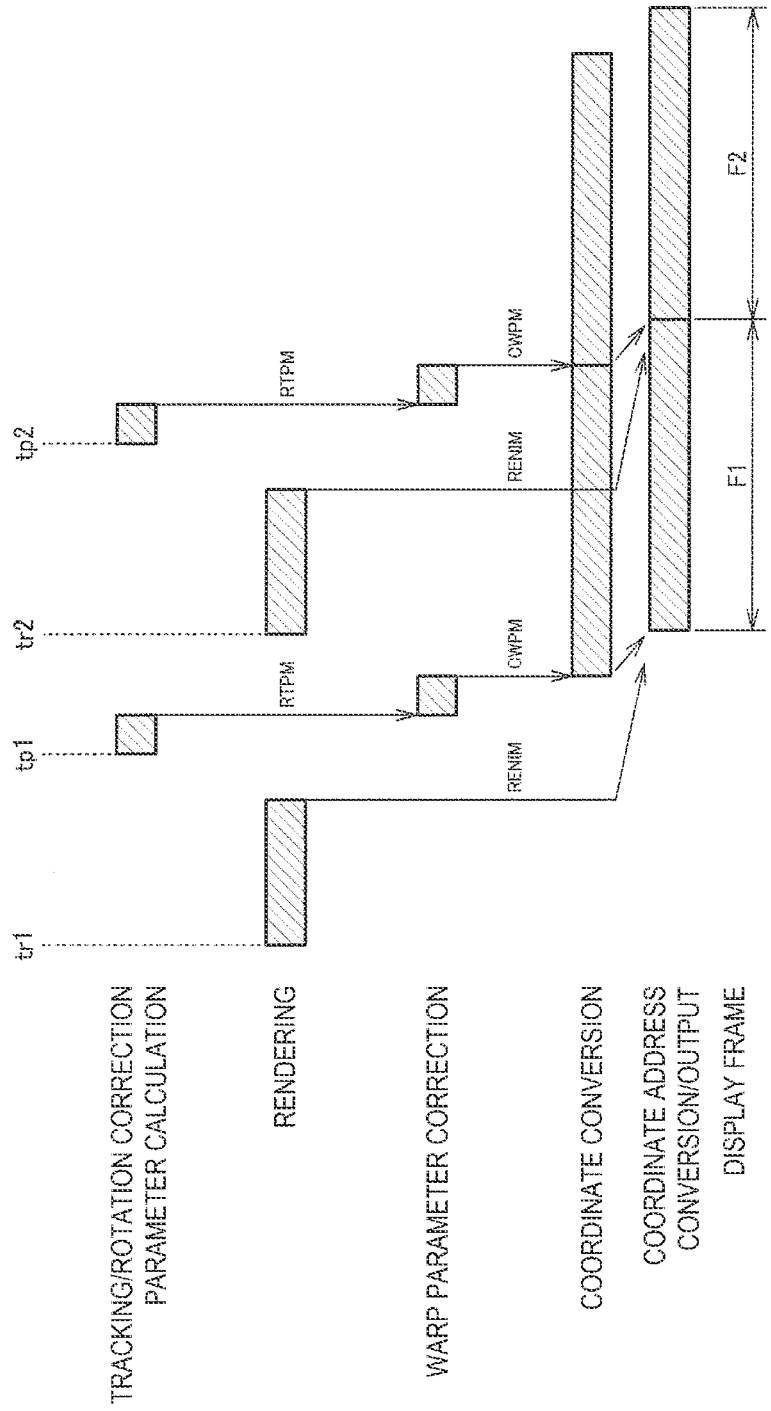
FIG. 7 is a timing chart for explaining the operation of the display system in the first configuration example.

FIG. 7 is a timing chart for explaining the operation of the display system 100 in a first configuration example. FIG. 7 schematically shows operation timings and does not show strict timings.

The rendering-image generating section 120 generates the rendering image RENIM from tracking information acquired at time tr1. In this embodiment, latency, that is, rotational deviation of the virtual object is caused by a time period from the time tr1 to HUD display.

The rotation-correction-parameter calculating section 140 calculates the rotation correction parameters RTPM from the tracking information acquired at the time tr1 and tracking information acquired at time tp1 later than the time tr1. Consequently, the rotation correction parameters RTPM for compensating for rotation in a period of a time difference tp1–tr1 are calculated.

The warp-parameter correcting section 146 calculates the post-correction warp parameters CWPM using the rotation correction parameters RTPM. The warp processing section 130 performs warp processing using the post-correction warp parameters CWPM and outputs the display image DSIM of a first frame to the HUD 400.

Similarly, the rendering-image generating section 120 generates the rendering image RENIM from tracking information acquired at time tr2. The rotation-correction-parameter calculating section 140 calculates the rotation correction parameters RTPM from the tracking information acquired at the time tr2 and tracking information acquired at time tp2 later than the time tr2. The warp-parameter correcting section 146 calculates the post-correction warp parameters CWPM using the rotation correction parameters RTPM. The warp processing section 130 performs warp processing using the post-correction warp parameters CWPM and outputs the display image DSIM of a second frame to the HUD 400.

In this embodiment, after the post-correction warp parameters CWPM are calculated, coordinate conversion using the post-correction warp parameters CWPM is immediately performed. Accordingly, it is possible to reduce time periods from the times tp1 and tp2 when the tracking information used for the calculation of the rotation correction parameters RTPM is acquired until when the display image DSIM is displayed. Specifically, the rotation correction parameters RTPM used for the warp processing performed in the second frame next to the first frame have been updated in the first frame. That is, latency from the time tp1 to the HUD display is shorter than one frame. Update timing for the rotation correction parameters RTPM only has to be within the first frame but is desirably timing as close as possible to a start of the second frame. For example, the update timing desirably belongs to a latter half period of divided two periods of the first frame and more desirably belongs to the last period of four divided periods of the first frame.

3. Second Detailed Configuration Example

Figure 8:
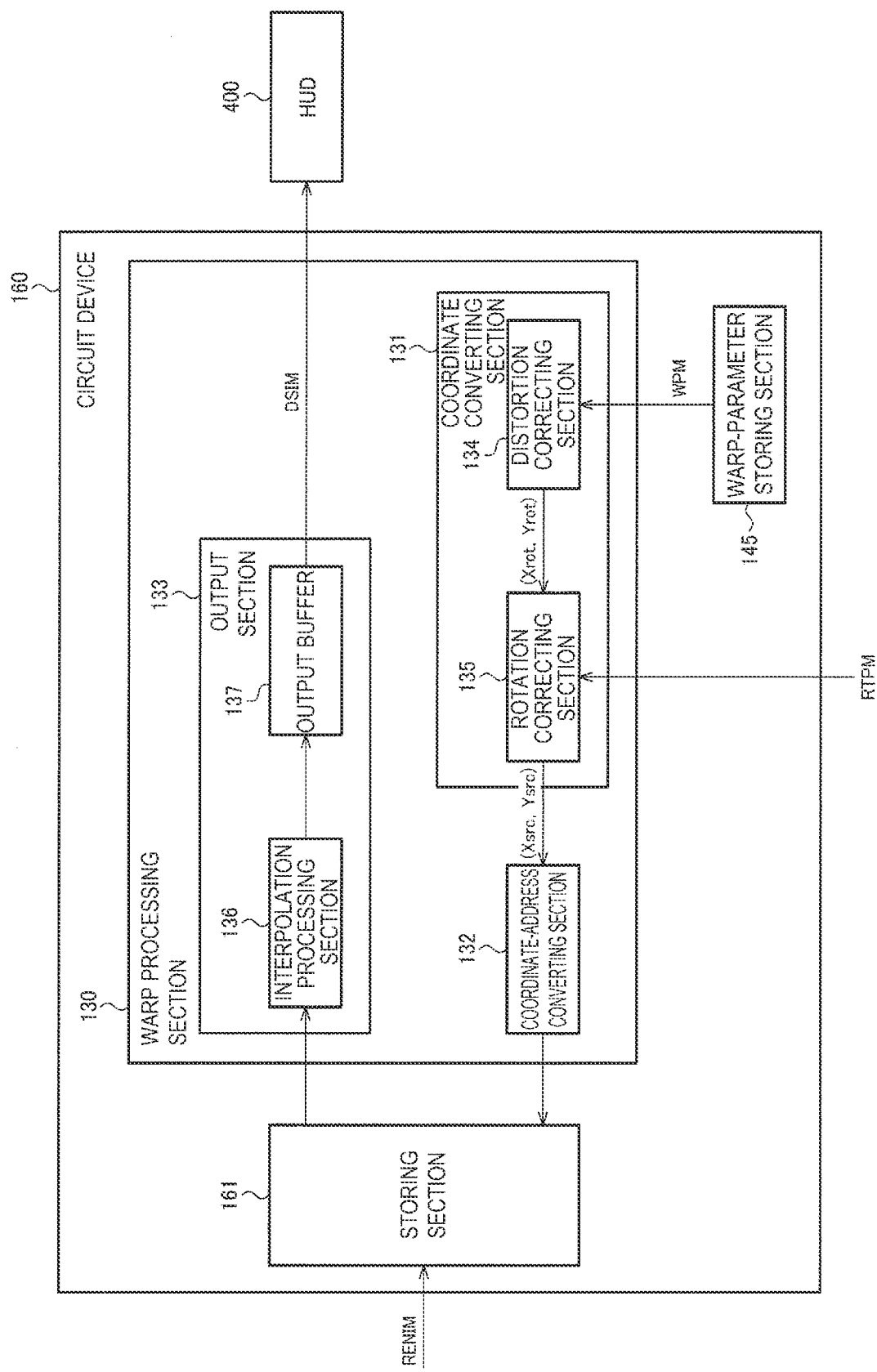
FIG. 8 is a second detailed configuration example of the circuit device.

FIG. 8 is a second detailed configuration example of the circuit device 160. In FIG. 8, the circuit device 160 includes the warp-parameter storing section 145. The coordinate converting section 131 includes a distortion correcting section 134 and a rotation correcting section 135. The output section 133 includes the interpolation processing section 136 and the output buffer 137. The components explained above are denoted by the same reference numerals and signs and explanation about the components is omitted as appropriate.

The distortion correcting section 134 performs first coordinate conversion for converting the output coordinate (Xtrg, Ytrg) according to the warp parameters WPM and calculates the coordinate (Xrot, Yrot). The first coordinate conversion is the calculation indicated by the above Expression (1).

The rotation correcting section 135 performs second coordinate conversion for subjecting the coordinate (Xrot, Yrot) after the first coordinate conversion to rotation processing according to the rotation correction parameters RTPM and calculates the input coordinate (Xsrc, Ysrc). The second coordinate conversion is the calculation indicated by the above Expression (2).

According to the embodiment explained above, since the rotational deviation correction is performed separately from the distortion correction, the calculation for correcting the warp parameters WPM is unnecessary. The rotation correcting section 135 performs the rotational deviation correction immediately before the coordinate address conversion. Consequently, compared with a configuration in which the warp parameter table for one screen is prepared in the memory once as in Patent Literature 2 described above, it is possible to reduce latency from the acquisition of the rotation correction parameters RTPM to the output of the display image DSIM.

Figure 9:
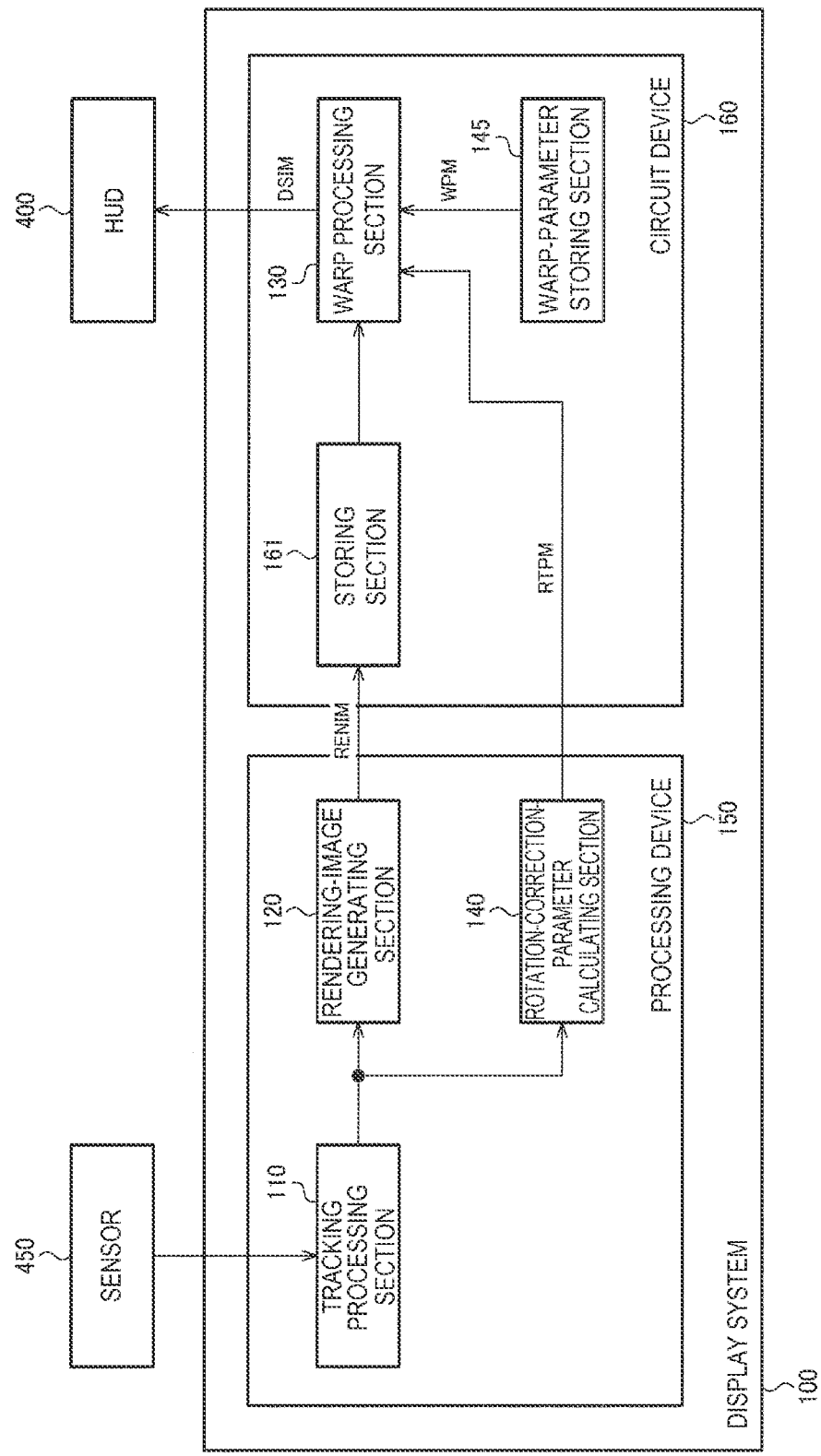
FIG. 9 is a second configuration example of the display system.

FIG. 9 is a second configuration example of the display system 100. The display system 100 includes the processing device 150 and the circuit device 160. The processing device 150 includes the tracking processing section 110, the rendering-image generating section 120, and the rotation-correction-parameter calculating section 140. The sections are as explained with reference to FIG. 6. The circuit device 160 includes the storing section 161, the warp-parameter storing section 145, and the warp processing section 130. The sections are as explained with reference to FIG. 8.

The configurations of the processing device 150 and the circuit device 160 shown in FIG. 9 are examples. The display system 100 only has to include the tracking processing section 110, the rendering-image generating section 120, the rotation-correction-parameter calculating section 140, the storing section 161, the warp processing section 130, and the warp-parameter storing section 145. For example, the rotation-correction-parameter calculating section 140 included in the processing device 150 in FIG. 9 may be included in the circuit device 160.

Figure 10:
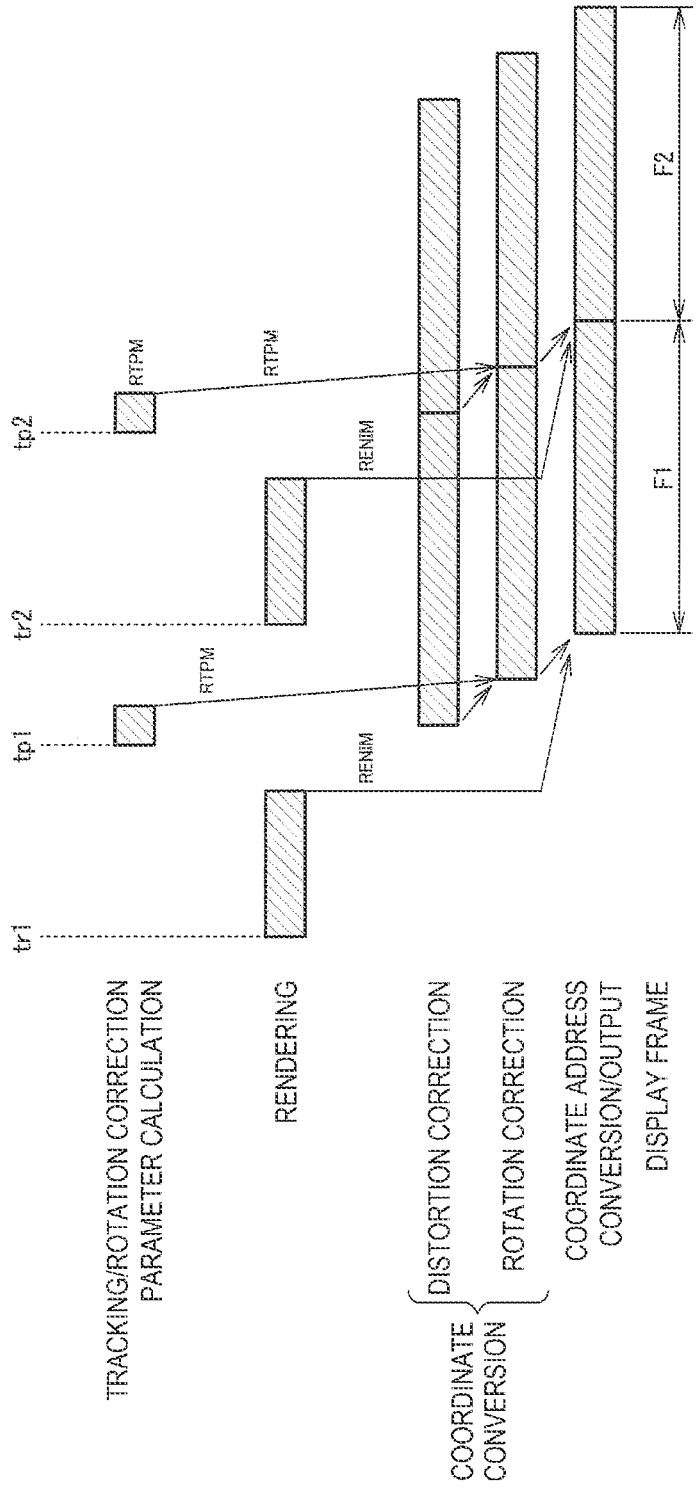
FIG. 10 is a timing chart for explaining the operation of the display system in the second configuration example.

FIG. 10 is a timing chart for explaining the operation of the display system 100 in the second configuration example. FIG. 10 schematically shows operation timings and does not show strict timings.

The rendering-image generating section 120 generates the rendering image RENIM from the tracking information acquired at the time tr1. In this embodiment, latency, that is, rotational deviation of the virtual object is caused by a time period from the time tr1 to the HUD display.

The rotation-correction-parameter calculating section 140 calculates the rotation correction parameters RTPM from the tracking information acquired at the time tr1 and the tracking information acquired at the time tp1 later than the time tr1. Consequently, the rotation correction parameters RTPM for compensating for the rotation in the period of the time difference tp1−tr1 are calculated.

The distortion correcting section 134 performs distortion correction using the warp parameters WPM. The rotation correcting section 135 performs rotational deviation correction for a coordinate after the distortion correction using the rotation correction parameters RTPM. The coordinate-address converting section 132 converts the coordinate after the rotational deviation correction into a read address. The output section 133 reads out pixel data from the read address and outputs the display image DSIM of the first frame to the HUD 400 according to the pixel data.

Similarly, the rendering-image generating section 120 generates the rendering image RENIM from the tracking information acquired at the time tr2. The rotation-correction-parameter calculating section 140 calculates the rotation correction parameters RTPM from the tracking information acquired at the time tr2 and the tracking information acquired at the time tp2 later than the time tr2. The distortion correcting section 134 performs distortion correction using the warp parameters WPM. The rotation correcting section 135 performs rotational deviation correction for a coordinate after the distortion correction using the rotation correction parameters RTPM. The coordinate-address converting section 132 converts the coordinate after the rotational deviation correction into a read address. The output section 133 reads out pixel data from the read address and outputs the display image DSIM of the second frame to the HUD 400 according to the pixel data.

In this embodiment, after the rotation correction parameters RTPM are calculated, rotation coordinate conversion using the rotation correction parameters RTPM is immediately performed. Accordingly, it is possible to reduce time periods from the times tp1 and tp2 when the tracking information used for the calculation of the rotation correction parameters RTPM is acquired until when the display image DSIM is displayed. Specifically, the rotation correction parameters RTPM used for the warp processing performed in the second frame next to the first frame have been updated in the first frame. That is, latency from the time tp1 to the HUD display is shorter than one frame. Update timing for the rotation correction parameters RTPM only has to be within the first frame but is desirably timing as close as possible to the start of the second frame. For example, the update timing desirably belongs to a latter half period of divided two periods of the first frame and more desirably belongs to the last period of four divided periods of the first frame.

4. Third Detailed Configuration Example and Fourth Detailed Configuration Example In FIG. 11, an explanatory diagram of processing in a third detailed configuration example and a fourth detailed configuration example is shown. Common portions of the third detailed configuration example and the fourth detailed configuration example are explained here. Differences are explained below with reference to FIGS. 12 and 13. An example in which the HUD is mounted on the automobile 30 is mainly explained with reference to FIG. 11. However, the HUD in this embodiment may be mounted on various moving bodies such as a plane, a ship, and a motorcycle.

Figure 11:
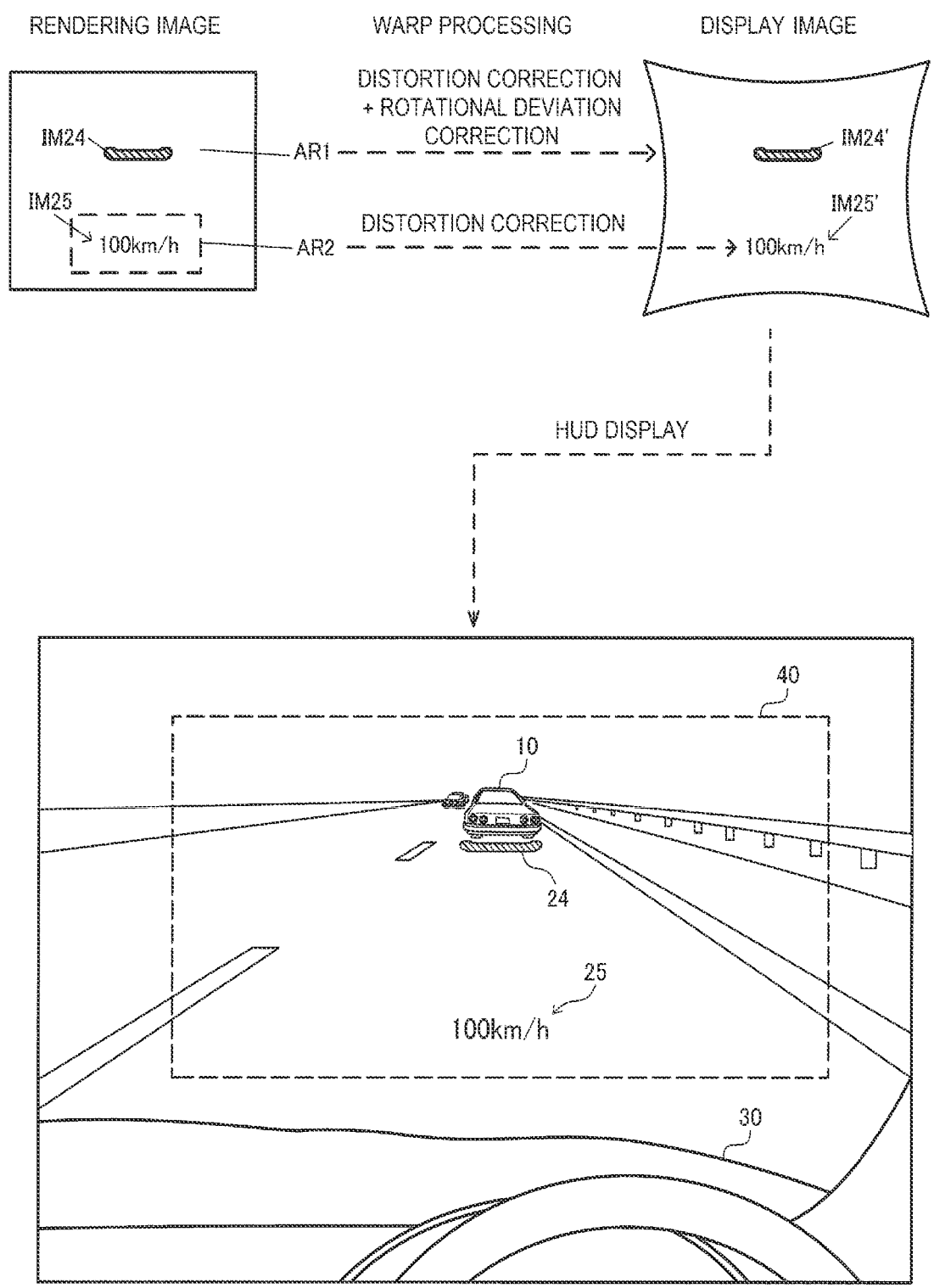
FIG. 11 is an explanatory diagram of processing in a third detailed configuration example and a fourth detailed configuration example.

As shown in an upper left figure of FIG. 11, a rendering image includes an image IM24 of a first display object and an image IM25 of a second display object. The images IM24 and IM25 mean portions of the rendering image and do not mean images different from the rendering image.

The first display object means a display object in AR display, that is, a virtual object displayed following a real object in a real space in the HUD. In a lower figure of FIG. 11, the preceding vehicle 10 is the real object. A first display object 24 is displayed following the preceding vehicle 10. The image IM24 of the first display object is an image for causing the HUD to display the first display object 24. In the upper left figure of FIG. 11, the portion of a hatched figure is the image IM24.

The second display object is a display object that does not follow the real object in the HUD and is a display object, a display position of which is fixed in the display image DSIM output from the circuit device 160 to the HUD 400. When a positional relation between an observer viewing the HUD and the HUD does not change, a display position of the second display object is fixed in the visual field of the observer. In the lower figure of FIG. 11, fixedly displayed characters "100 km/h" are a second display object 25. The image IM25 of the second display object is an image for causing the HUD to display the second display object 25. In the upper left figure of FIG. 11, the portion of characters "100 km/h" is the image IM25.

As shown in the upper left figure and an upper right figure of FIG. 11, the warp processing section 130 performs distortion correction and rotational deviation correction for a first region AR1 in the rendering image. That is, for the first region AR1, the coordinate converting section 131 calculates an input coordinate to which rotation processing is applied by coordinate conversion based on the warp parameters WPM and the rotation correction parameters RTPM. The warp processing section 130 performs the distortion correction for the second region AR2 in the rendering image but does not perform the rotational deviation correction for the second region AR2. That is, for the second region AR2, the coordinate converting section 131 calculates an input coordinate to which the rotation processing is not applied by coordinate conversion based on the warp parameters WPM. Consequently, distortion for cancelling distortion that occurs in the HUD 400 is given to a display image. The display image includes an image IM24' of the first display object subjected to the distortion correction and the rotational deviation correction and an image IM25' of the second display object subjected to the distortion correction.

The first region AR1 is a region including the image IM24 of the first display object and not including the image IM25 of the second display object in the rendering image. Specifically, the first region AR1 is a region other than the second region AR2 in the rendering image. When the rendering image includes an image of a third display object and the third display object is AR-displayed, the first region AR1 is set to include the image IM24 of the first display object and the image of the third display object.

The second region AR2 is a region including the image IM25 of the second display object in the rendering image. Specifically, the second region AR2 is a region including the entire image IM25 of the second display object. When the rendering image includes the image of the third display object and the third display object is fixedly displayed, the second region AR2 is set to include the image IM25 of the second display object and the image of the third display object.

As shown in the upper right figure and the lower figure of FIG. 11, the warp processing section 130 outputs a display image to the HUD 400. The HUD 400 projects the display image onto the screen and the observer views the screen, whereby the display image is seen overlapping the real space as a virtual image from the observer. In the lower figure of FIG. 11, AR display viewed by the driver, who is the observer, via the HUD 400 is shown. The driver is viewing, through the windshield, the preceding vehicle 10, a road on which the preceding vehicle 10 travels, and a scene around the preceding vehicle 10 and the road. The driver is viewing a virtual image projected in the display region 40 of the screen by the HUD 400. The display region 40 indicates a range in which the HUD 400 is capable of projecting the virtual image.

The virtual image includes the first display object 24 and the second display object 25. Specifically, in the display image in the upper right figure of FIG. 11, a portion other than the image IM24' of the first display object and the image IM25' of the second display object is black, which is transparent display in the HUD 400. In the display image projected by the HUD 400, the first display object 24 is projected by the image IM24' of the first display object and the second display object 25 is projected by the image IM25' of the second display object. In the virtual image, a portion other than the display objects is transparent. Only the display objects are seen overlapping the real space from the observer. The entire virtual image generated by the HUD 400 is referred to as "virtual image". A portion not transparent and recognized by the observer in the virtual image is referred to as "display object". A background of the display objects does not always need to be transparent. In that case, a specific portion in the virtual image may be referred to as display object.

According to the embodiment explained above, the rotational deviation correction is performed for the first display object 24 caused to follow the real object and is not performed for the second display object 25 not caused to follow the real object. Consequently, for the first display object 24 in the virtual image projected by the HUD 400, AR display applied with the rotational deviation correction can be realized. It is possible to cause the first display object 24 to more accurately follow the preceding vehicle 10 compared with when the first display object 24 is not subjected to the rotational deviation correction. On the other hand, the second display object 25, which is not a target of the AR display, can be fixedly displayed in the visual field of the observer of the HUD 400. The second display object 25 is clearly displayed without being affected by a change in the position or the posture of the automobile 30.

Figure 12:
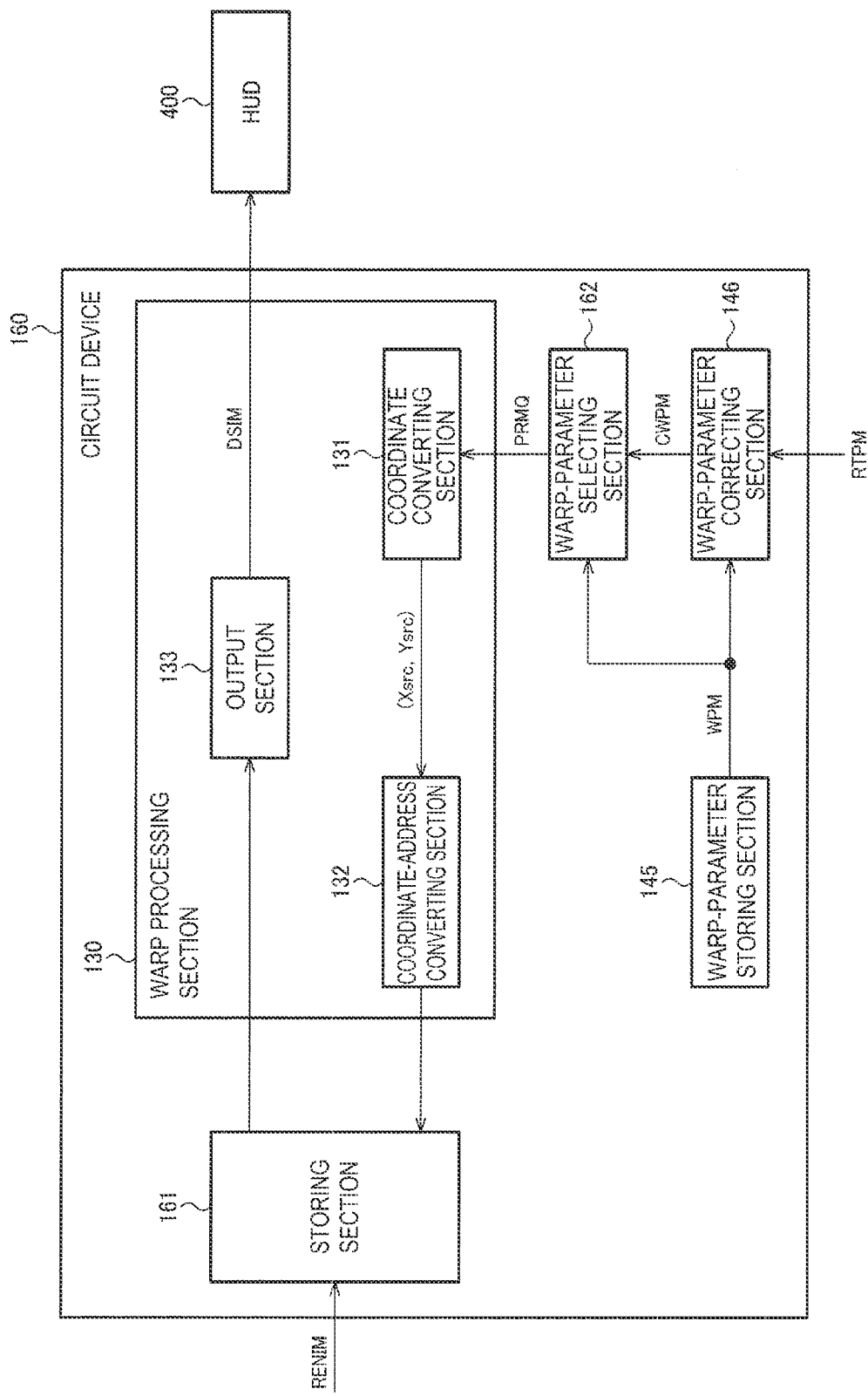
FIG. 12 is the third detailed configuration example of the circuit device.

FIG. 12 is a third detailed configuration example of the circuit device 160. In FIG. 12, compared with the first detailed configuration example, the circuit device 160 includes a warp-parameter selecting section 162. The components explained above are denoted by the same reference numerals and signs and explanation about the components is omitted as appropriate.

The warp-parameter selecting section 162 selects the post-correction warp parameters CWPM when the first region AR1 corresponding to the AR display is subjected to warp processing and selects the warp parameters WPM when the second region AR2 corresponding to the fixed display is subjected to warp processing. The selected parameters are output to the warp processing section 130 as warp parameters PRMQ. The coordinate converting section 131 performs coordinate conversion using the warp parameters PRMQ. Consequently, the coordinate converting section 131 performs, for the first region AR1 corresponding to the AR display, coordinate conversion based on the warp parameters WPM and the rotation correction parameters RTPM and performs, for the second region AR2 corresponding to the fixed display, coordinate conversion based on the warp parameters WPM.

The warp-parameter selecting section 162 can discriminate the first region AR1 or the second region AR2 from a coordinate of a pixel subjected to warp processing by the warp processing section 130. In inverse warp, it is determined that to which of the first region AR1 and the second region AR2 a pixel of a display image on an output side corresponds. The rendering image and the display image are associated by the distortion correction. The region can be determined from the association.

According to this embodiment, since the coordinate conversion based on the warp parameters WPM and the rotation correction parameters RTPM is performed for the first region AR1, the distortion correction and the rotational deviation correction are performed for the image IM24 of the first display object. Since the coordinate conversion based on the warp parameters WPM is performed for the second region AR2, the distortion correction is performed and the rotational deviation correction is not performed for the image IM25 of the second display object.

Figure 13:
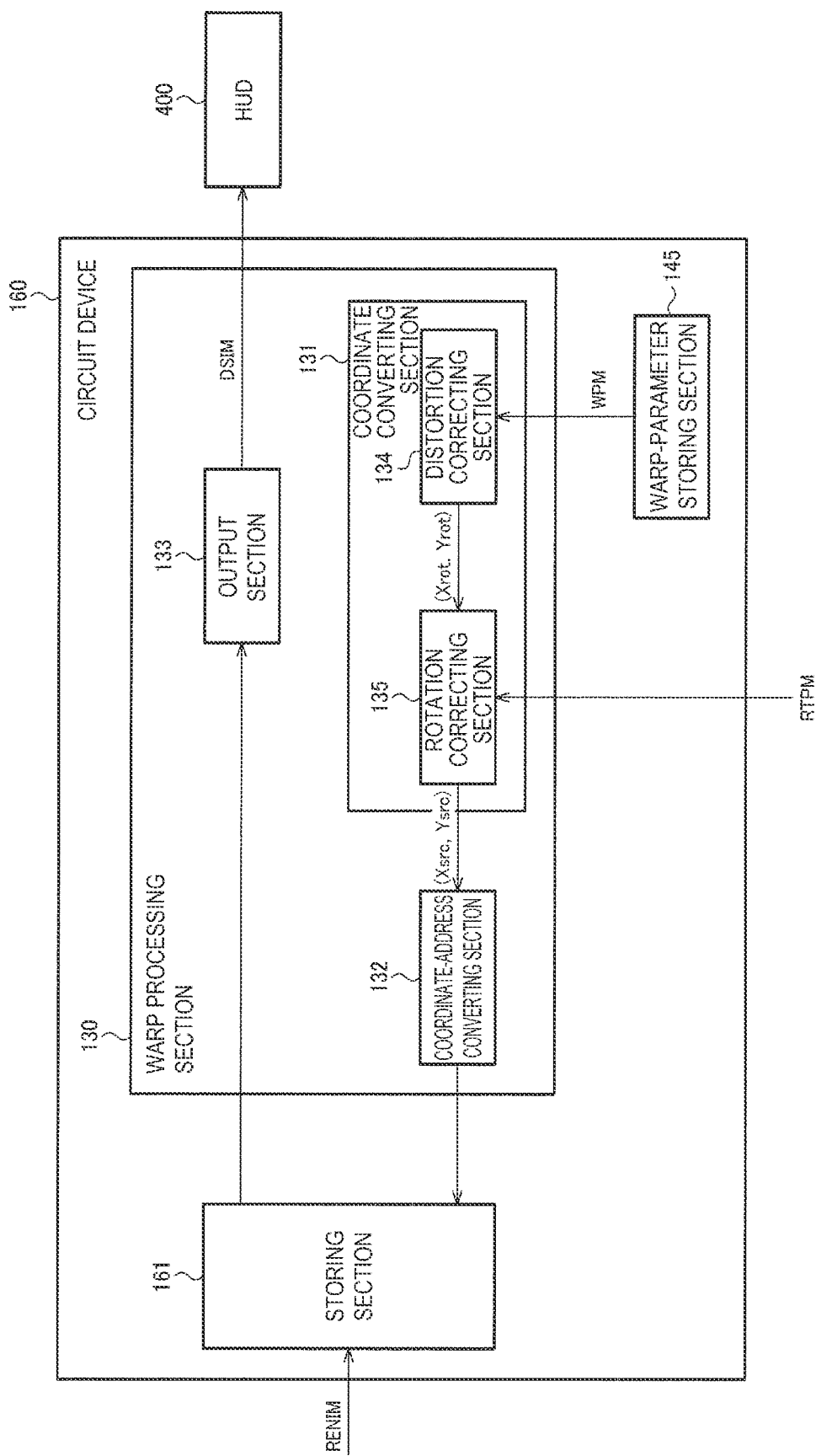
FIG. 13 is the fourth detailed configuration example of the circuit device.

FIG. 13 is a fourth detailed configuration example of the circuit device 160. In FIG. 13, compared with the second detailed configuration example, the rotation correcting section 135 performs rotation processing corresponding to a region. The components explained above are denoted by the same reference numerals and signs and explanation about the components is omitted as appropriate.

For the first region AR1 corresponding to the AR display, the distortion correcting section 134 performs, first coordinate conversion for converting the output coordinate (Xtrg, Ytrg) according to the warp parameters WPM and the rotation correcting section 135 performs second coordinate conversion for subjecting the coordinate (Xrot, Yrot) after the first coordinate conversion to the rotation processing according to the rotation correction parameters RTPM. The rotation correcting section 135 outputs the input coordinate (Xsrc, Ysrc) obtained by the second coordinate conversion to the coordinate-address converting section 132. On the other hand, for the second region AR2 corresponding to the fixed display, the distortion correcting section 134 performs the first coordinate conversion but the rotation correcting section 135 does not perform the second coordinate conversion. The rotation correcting section 135 outputs the coordinate (Xrot, Yrot) after the first coordinate conversion to the coordinate-address converting section 132 as the input coordinate (Xsrc, Ysrc). The rotation correcting section 135 determines, for example, based on the input coordinate (Xsrc, Ysrc), whether the coordinate belongs to the first region AR1 or belongs to the second region AR2. Alternatively, the rotation correcting section 135 may calculate the input coordinate (Xsrc, Ysrc) from the output coordinate (Xtrg, Ytrg) and determine whether the input coordinate (Xsrc, Ysrc) belongs to the first region AR1 or belongs to the second region AR2. The rotation correcting section 135 performs the second coordinate conversion when the input coordinate (Xsrc, Ysrc) belongs to the first region AR1 and does not perform the second coordinate conversion when the input coordinate (Xsrc, Ysrc) belongs to the second region AR2.

According to this embodiment, since the first coordinate conversion and the second coordinate conversion are performed for the first region AR1, the distortion correction and the rotational deviation correction are performed for the image IM24 of the first display object. Since the first coordinate conversion is performed but the second coordinate conversion is not performed for the second region AR2, the distortion correction is performed and the rotational deviation correction is not performed for the image IM25 of the second display object.

5. Electronic Apparatus

Figure 14:
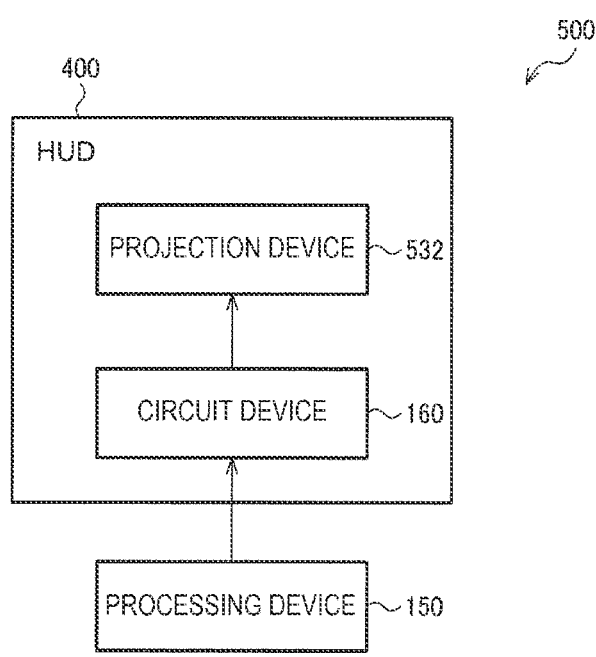
FIG. 14 is a configuration example of an electronic apparatus.

FIG. 14 is a configuration example of an electronic apparatus 500 to which the circuit device 160 is applied. The electronic apparatus 500 includes the processing device 150 and the HUD 400.

The HUD 400 includes the circuit device 160, which is a HUD controller, and a projection device 532. The processing device 150 transmits a rendering image to the circuit device 160. The circuit device 160 subjects the rendering image to warp processing and outputs a display control signal to the projection device 532 together with a display image, which is a result of the warp processing. The projection device 532 includes, for example, a display driver, a liquid crystal display panel, a light source, and an optical device. The display driver causes the liquid crystal display panel to display an image based on image data and the display control signal received from the circuit device 160. The light source emits projection light to the liquid crystal display panel. The projection light transmitted through the liquid crystal display panel is made incident on the optical device. The optical device projects the projection light transmitted through the liquid crystal display panel onto a screen. The screen is, for example, a windshield of a moving body. However, a dedicated screen may be provided. The moving body is an automobile, an airplane, a ship, or the like.

The circuit device in this embodiment explained above performs display control for a head-up display that displays, in a display region, a virtual object corresponding to a real object in a real space. The circuit device includes: a storing section configured to store a rendering image including the virtual object; and a warp processing section configured to perform warp processing for the rendering image and generate a display image to be displayed in the display region. The warp processing section includes: a coordinate converting section; a coordinate-address converting section; and an output section. The coordinate converting section converts, with coordinate conversion based on warp parameters corresponding to a distortion of a video due to an optical system and rotation correction parameters, an output coordinate, which is a coordinate on the display image, into an input coordinate, which is a coordinate on the rendering image, to calculate the input coordinate to which rotation processing for correcting rotation indicated by the rotation correction parameters is applied. The coordinate-address converting section converts the input coordinate into a read address of the storing section. The output section reads out pixel data of the rendering image from the read address of the storing section and outputs, based on the read-out pixel data, pixel data in the output coordinate of the display image.

According to this embodiment, immediately before the pixel data is read out from the storing section, the coordinate conversion based on the warp parameters and the rotation correction parameters is executed and the display image is output based on the read-out pixel data. Consequently, it is possible to minimize latency from rotational deviation correction to the output of the display image. For example, when this embodiment is applied to AR display, it is possible to cause the virtual object to highly accurately follow the real object.

In this embodiment, the circuit device may include a warp-parameter correcting section configured to correct the warp parameters with the rotation correction parameters to calculate post-correction warp parameters. The coordinate converting section may perform the coordinate conversion using the post-correction warp parameters.

According to this embodiment, the warp-parameter correcting section calculates the post-correction warp parameters immediately before the coordinate conversion by the coordinate converting section. The coordinate converting section converts the output coordinate into the input coordinate using the post-correction warp parameters. Consequently, compared with a configuration in which the warp parameter table for one screen is prepared in the memory once as in Patent Literature 2 described above, it is possible to reduce latency from the acquisition of the rotation correction parameters to the output of the display image.

In this embodiment, the coordinate converting section may perform, as the coordinate conversion, first coordinate conversion for converting the output coordinate according to the warp parameters and second coordinate conversion for subjecting a coordinate after the first coordinate conversion to the rotation processing according to the rotation correction parameters.

According to this embodiment, since the rotational deviation correction is performed separately from the distortion correction, a calculation for correcting the warp parameters is unnecessary. The rotation correcting section performs the rotational deviation correction immediately before the coordinate address conversion. Consequently, compared with a configuration in which the warp parameter table for one screen is prepared in the memory once as in Patent Literature 2 described above, it is possible to reduce latency from the acquisition of the rotation correction parameters to the output of the display image.

In this embodiment, the rotation correction parameters may be latency compensation parameters for compensating for latency including rendering processing latency of the rendering image based on tracking information, which is at least one of first tracking information of a moving body mounted with the head-up display, second tracking information of an observer of the head-up display, and third tracking information of the real object.

According to this embodiment, after the post-correction warp parameters are calculated, the coordinate conversion using the post-correction warp parameters is immediately performed. Accordingly, it is possible to reduce a time period from the time when the tracking information used for the calculation of the rotation correction parameters is acquired until when the display image is displayed. Consequently, since the rotational deviation correction is executed according to the rotation correction parameters acquired at timing as close as possible to display timing of the display image, it is possible to highly accurately compensate for latency from when the rendering image is rendered until when the display image is displayed.

In this embodiment, the warp parameters may be coefficients of a polynomial for correcting the distortion of the video.

In distortion correction in a table scheme, a plurality of parameters corresponding to a plurality of coordinates are used. For example, in Patent Literature 2 described above, since the vibration correction is applied to each parameter of the plurality of parameters, a calculation for the vibration correction takes time. In this regard, according to this embodiment, since the distortion correction is performed by only the polynomial, the warp processing can be realized only by one set of warp parameters. Consequently, a calculation time can be reduced compared with the table scheme.

In this embodiment, the coordinate converting section may calculate, in the warp processing performed in a second frame next to a first frame, the input coordinate to which the rotation processing is applied using the rotation correction parameters updated in the first frame.

According to this embodiment, latency from the time when the tracking information used for the calculation of the rotation correction parameters is acquired to the HUD display is shorter than one frame. Consequently, the rotational deviation correction is executed according to the rotation correction parameters acquired at timing as close as possible to the display timing of the display image.

In this embodiment, the coordinate-address converting section may generate a read address group based on a reference read address, which is the read address. The output section may include an interpolation processing section configured to read out a pixel data group corresponding to the read address group and perform interpolation processing for the pixel data group to generate pixel data of the output coordinate.

In inverse warp, an input coordinate obtained by converting an output coordinate does not always coincide with a pixel position of a rendering image. According to this embodiment, pixel data in the input coordinate can be interpolated from the pixel data group. The pixel data can be set as pixel data of the output coordinate.

In this embodiment, the storing section may store the rendering image including an image of a first display object, which is the virtual object, and an image of a second display object. For the image of the first display object in the rendering image, the coordinate converting section may calculate, with the coordinate conversion based on the warp parameters and the rotation correction parameters, the input coordinate to which the rotation processing is applied. For the image of the second display object in the rendering image, the coordinate converting section may calculate, with the coordinate conversion based on the warp parameters, the input coordinate to which the rotation processing is not applied.

According to this embodiment, the rotational deviation correction is performed for the first display object caused to follow the real object and the rotational deviation correction is not performed for the second display object not caused to follow the real object. Consequently, for the first display object in a virtual image projected by a HUD, AR display applied with the rotational deviation correction can be realized. On the other hand, the second display object, which is not a target of the AR display, can be fixedly displayed in a visual field of an observer of the HUD and is clearly displayed without being affected by a change in the position or the posture of the moving body.

In this embodiment, the circuit device may include: a warp-parameter correcting section configured to correct the warp parameters with the rotation correction parameters to calculate post-correction warp parameters; and a parameter selecting section. The storing section may store the rendering image including the image of the first display object and the image of the second display object. For the image of the first display object in the rendering image, the parameter selecting section may select the post-correction warp parameters and the coordinate converting section may perform the coordinate conversion using the post-correction warp parameters. For the image of the second display object in the rendering image, the parameter selecting section may select the warp parameters and the coordinate converting section may perform the coordinate conversion using the warp parameters.

According to this embodiment, since the coordinate conversion based on the warp parameters and the rotation correction parameters is performed for the image of the first display object, the distortion correction and the rotational deviation correction are performed for the image of the first display object. Since the coordinate conversion based on the warp parameters is performed for the image of the second display object, the distortion correction is performed and the rotational deviation correction is not performed for the image of the second display object.

In this embodiment, the storing section may store the rendering image including the image of the first display object and the image of the second display object. For the image of the first display object in the rendering image, the coordinate converting section may perform, as the coordinate conversion, first coordinate conversion for converting the output coordinate according to the warp parameters and second coordinate conversion for subjecting a coordinate after the first coordinate conversion to the rotation processing according to the rotation correction parameters. The coordinate converting section may perform the first coordinate conversion as the coordinate conversion for the image of the second display object in the rendering image.

According to this embodiment, since the first coordinate conversion and the second coordinate conversion are performed for the image of the first display object, the distortion correction and the rotational deviation correction are performed for the image of the first display object. Since the first coordinate conversion is performed but the second coordinate conversion is not performed for the image of the second display object, the distortion correction is performed and the rotational deviation correction is not performed for the image of the second display object.

The display system according to this embodiment displays, in a display region, a virtual object corresponding to a real object in a real space. The display system includes: a rendering-image generating section configured to generate a rendering image including the virtual object; a storing section configured to store the rendering image; and a warp processing section configured to perform warp processing for the rendering image and generate a display image to be displayed in the display region. The warp processing section includes: a coordinate converting section; a coordinate-address converting section; and an output section. The coordinate converting section converts, with coordinate conversion based on warp parameters corresponding to a distortion of a video due to an optical system and rotation correction parameters, an output coordinate, which is a coordinate on the display image, into an input coordinate, which is a coordinate on the rendering image, to calculate the input coordinate to which rotation processing for correcting rotation indicated by the rotation correction parameters is applied. The coordinate-address converting section converts the input coordinate into a read address of the storing section. The output section reads out pixel data of the rendering image from the read address of the storing section and outputs, based on the read-out pixel data, pixel data in the output coordinate of the display image.

In this embodiment, the display system may include a warp-parameter correcting section configured to correct the warp parameters with the rotation correction parameters to calculate post-correction warp parameters. The coordinate converting section may perform the coordinate conversion using the post-correction warp parameters.

In this embodiment, the coordinate converting section may perform, as the coordinate conversion, first coordinate conversion for converting the output coordinate according to the warp parameters and second coordinate conversion for subjecting a coordinate after the first coordinate conversion to the rotation processing according to the rotation correction parameters.

In this embodiment, the display system may include a rotation-correction-parameter calculating section. The rotation-correction-parameter calculating section may calculate the rotation correction parameters based on tracking information, which is at least one of first tracking information of a moving body mounted with a head-up display, second tracking information of an observer of the head-up display, and third tracking information of the real object. The rotation correction parameters may be latency compensation parameters for compensating for latency including rendering processing latency of the rendering image.

The electronic apparatus of this embodiment includes the circuit device described in any one of the above paragraphs.

This embodiment is explained in detail above. However, those skilled in the art could easily understand that many modifications not substantively departing from the new matters and the effects of the present disclosure are possible. Therefore, all of such modifications are deemed to be included in the scope of the present disclosure. For example, terms described together with broader or synonymous different terms at least once in the specification or the drawings can be replaced with the different terms in any part of the specification or the drawings. All combinations of this embodiment and the modifications are also included in the scope of the present disclosure. The configurations, the operations, and the like of the circuit device, the display system, the HUD, the electronic apparatus, and the like are not limited to those explained in this embodiment. Various modified implementations are possible.

What is claimed is:

1. A circuit device that performs display control for a head-up display of a moving object that displays, in a display region, a virtual object corresponding to a preceding moving object in a real space and a fixed image relating to the moving object, the circuit device comprising:

a processor configured to:
receive output signals from a sensor disposed in the moving object, the sensor being configured to detect a position, a posture, and a motion of the preceding moving object so as to track the preceding moving object;
continuously output a tracking result of the preceding moving object based on the continuously received output signals from the sensor;
render the virtual object based on the tracking result so as to obtain an object-view position in the display region through which the preceding moving object is seen and generate a rendering image including the virtual object;
render a fixed object corresponding to the fixed image to generate the rendering image including the fixed object;
calculate a rotation correction parameter that is a latency compensation parameter compensating for latency including rendering processing latency of the rendering image based on the tracking result; and
correct a warp parameter with the rotation correction parameter to provide a post-correction warp parameter, the warp parameter corresponding to a distortion of a video due to an optical system;

a memory configured to store the rendering image including the virtual object and the fixed object; and a warp engine logic circuit configured to:
perform warp processing for the rendering image and generate a first display image and a pre-conversion fixed image;
convert, with coordinate conversion based on the post-correction warp parameter and the rotation correction parameter, a first output coordinate, which is a coordinate on the first display image, into a first input coordinate, which is a coordinate on the rendering image;
convert, with the coordinate conversion based on the warp parameter, a
second output coordinate, which is a coordinate on the pre-conversion fixed image, into
a second input coordinate, which is a coordinate on the rendering image;
convert the first input coordinate into a first read address of the memory;
convert the second input coordinate into a second read address of the memory;
read out pixel data of the rendering image from the first read address of the memory and output, based on the read-out pixel data, first pixel data in the first output coordinate of the first display image;
read out pixel data of the rendering image from the second read address of the memory and output, based on the read-out pixel data, second pixel data in the second output coordinate of the pre-conversion fixed image;

generate a second display image of the virtual object based on the output first pixel data;

generate the fixed image of the fixed object based on the output second pixel data;

display the second display image including the virtual object in the display region at a position directly adjacent to the object-view position corresponding to the preceding moving object in the real space based on the tracking result in a state in which the displayed virtual object is configured to be moved in the display region by following the preceding moving object; and display the fixed image at a fixed position in the display region.

2. The circuit device according to claim 1, wherein the warp engine logic circuit is further configured to perform, as the coordinate conversion, first coordinate conversion for converting the first output coordinate according to the warp parameter and second coordinate conversion for subjecting a coordinate after the first coordinate conversion to rotation processing according to the rotation correction parameter.

3. The circuit device according to claim 1, wherein the warp parameter is a coefficient of a polynomial for correcting the distortion of the video.

4. The circuit device according to claim 1, wherein the warp engine logic circuit is further configured to calculate, in the warp processing performed in a second frame next to a first frame, the first input coordinate to which rotation processing is applied using the rotation correction parameter updated in the first frame.

5. The circuit device according to claim 1, wherein the warp engine logic circuit is further configured to:

generate a read address group based on a reference read address, which is the first read address;

read out a pixel data group corresponding to the read address group; and perform interpolation processing for the pixel data group to generate the first pixel data of the first output coordinate.

6. The circuit device according to claim 1, wherein the memory is configured to store the rendering image including an image of a first display object, which is the virtual object, and an image of a second display object, which is the fixed object, for the image of the first display object in the rendering image, the warp engine logic circuit is configured to calculate, with the coordinate conversion based on the warp parameter and the rotation correction parameter, the first input coordinate to which rotation processing is applied, and for the image of the second display object in the rendering image, the warp engine logic circuit is configured to calculate, with the coordinate conversion based on the warp parameter, the second input coordinate to which the rotation processing is not applied.

7. The circuit device according to claim 6, wherein for the image of the first display object in the rendering image:

the post-correction warp parameter is selected; and the warp engine logic circuit is configured to perform the coordinate conversion using the post-correction warp parameter, and for the image of the second display object in the rendering image:

the warp parameter is selected; and the warp engine logic circuit is configured to perform the coordinate conversion using the warp parameter.

8. The circuit device according to claim 6, wherein for the image of the first display object in the rendering image, the warp engine logic circuit is configured to perform, as the coordinate conversion, first coordinate conversion for converting the first output coordinate according to the warp parameter and second coordinate conversion for subjecting a coordinate after the first coordinate conversion to the rotation processing according to the rotation correction parameter, and the warp engine logic circuit is configured to perform the first coordinate conversion for converting the second output coordinate according to the warp parameter as the coordinate conversion for the image of the second display object in the rendering image.

9. An electronic apparatus comprising the circuit device according to claim 1.

10. A display system comprising:

a head-up display of a moving object, the head-up display being configured to display a virtual object corresponding to a preceding moving object in a real space and a fixed image relating to the moving object in a display region;

a processor configured to:

receive output signals from a sensor disposed in the moving object, the sensor being configured to detect a position, a posture, and a motion of the preceding moving object so as to track the preceding moving object;

continuously output a tracking result of the preceding moving object based on the continuously received output signals from the sensor;

render the virtual object based on the tracking result so as to obtain an object-view position in the display region through which the preceding moving object is seen and generate a rendering image including the virtual object;

render a fixed object corresponding to the fixed image to generate the rendering image including the fixed object;

calculate a rotation correction parameter that is a latency compensation parameter compensating for latency including rendering processing latency of the rendering image based on the tracking result; and correct a warp parameter with the rotation correction parameter to provide a post-correction warp parameter, the warp parameter corresponding to a distortion of a video due to an optical system;

a memory configured to store the rendering image including the virtual object and the fixed object; and a warp engine logic circuit configured to:

perform warp processing for the rendering image and generate a first display image and a pre-conversion fixed image;

convert, with coordinate conversion based on the post-correction warp parameter and the rotation correction parameter, a first output coordinate, which is a coordinate on the first display image, into a first input coordinate, which is a coordinate on the rendering image;

convert, with the coordinate conversion based on the warp parameter, a second output coordinate, which is a coordinate on the pre-conversion fixed image, into a second input coordinate, which is a coordinate on the rendering image;

convert the first input coordinate into a first read address of the memory;

convert the second input coordinate into a second read address of the memory;

read out pixel data of the rendering image from the first read address of the memory and output, based on the read-out pixel data, first pixel data in the first output coordinate of the first display image;

read out pixel data of the rendering image from the second read address of the memory and output, based on the read-out pixel data, second pixel data in the second output coordinate of the pre-conversion fixed image;

generate a second display image of the virtual object based on the output first pixel data;

generate the fixed image of the fixed object based on the output second pixel data;

display the second display image including the virtual object in the display region at a position directly adjacent to the object-view position corresponding to the preceding moving object in the real space based on the tracking result in a state in which the displayed virtual object is configured to be moved in the display region by following the preceding moving object; and display the fixed image at a fixed position in the display region.

11. The display system according to claim 10, wherein the warp engine logic circuit is further configured to perform, as the coordinate conversion, first coordinate conversion for converting the first output coordinate according to the warp parameter and second coordinate conversion for subjecting a coordinate after the first coordinate conversion to rotation processing according to the rotation correction parameter.

* * * * *